United States Patent
Filsfils et al.

(10) Patent No.: US 9,559,954 B2
(45) Date of Patent: Jan. 31, 2017

(54) INDEXED SEGMENT ID

(71) Applicant: Cisco Technology, Inc., San Jose, CA (US)

(72) Inventors: Clarence Filsfils, Brussels (BE); Stefano B. Previdi, Rome (IT); Ahmed R. Bashandy, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 455 days.

(21) Appl. No.: 14/155,601

(22) Filed: Jan. 15, 2014

(65) Prior Publication Data
US 2014/0254596 A1 Sep. 11, 2014

Related U.S. Application Data

(60) Provisional application No. 61/776,463, filed on Mar. 11, 2013.

(51) Int. Cl.
| | |
|---|---|
| *H04L 12/741* | (2013.01) |
| *H04L 12/801* | (2013.01) |
| *H04L 12/751* | (2013.01) |
| *H04L 12/701* | (2013.01) |
| *H04L 12/723* | (2013.01) |

(52) U.S. Cl.
CPC ............ *H04L 45/745* (2013.01); *H04L 45/00* (2013.01); *H04L 45/02* (2013.01); *H04L 45/50* (2013.01); *H04L 45/54* (2013.01)

(58) Field of Classification Search
CPC ...... H04L 45/50; H04L 45/66; H04L 12/4675; H04L 45/54; H04L 45/745; H04L 12/4633; H04L 12/465; H04L 12/4666; H04L 12/66
See application file for complete search history.

(56) References Cited

U.S. PATENT DOCUMENTS

| | | | |
|---|---|---|---|
| 6,032,197 A | 2/2000 | Birdwell | 709/216 |
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |

(Continued)

OTHER PUBLICATIONS

Francois, Pierre Jean Rene; "Loop Avoidance During Network Convergence in Switched Networks"; U.S. Appl. No. 14/319,353, filed Jun. 30, 2014; consisting of Specification, Claims and Abstract (29 pages); and Drawings (6 sheets).

(Continued)

*Primary Examiner* — Awet Haile
(74) *Attorney, Agent, or Firm* — Campbell Stephenson LLP

(57) ABSTRACT

An apparatus and method for using indexed segment identifiers in segment routing. An example method involves receiving a globally unique index value at a node. The method also involves receiving a base value at the node, where the base value comprises a segment routing value configured to identify a nodal segment. The method then involves calculating a segment identifier based on the index value and the base value.

20 Claims, 16 Drawing Sheets

(56) References Cited

U.S. PATENT DOCUMENTS

| | | | |
|---|---|---|---|
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/389 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1 | 2/2015 | Aggarwal | 370/389 |
| 9,036,474 B2 | 5/2015 | Dibirdi et al. | 370/235 |
| 9,112,734 B2 | 8/2015 | Edwards et al. | |
| 9,118,572 B2 | 8/2015 | Sajassi | |
| 2001/0037401 A1 | 11/2001 | Soumlya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0075134 A1 | 4/2006 | Aalto | 709/238 |
| 2006/0080421 A1 | 4/2006 | Hu | 709/123 |
| 2006/0092940 A1 | 5/2006 | Ansari | 370/392 |
| 2006/0126272 A1 | 6/2006 | Cori et al. | 709/230 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Slerekl | 370/351 |
| 2007/0058638 A1 | 3/2007 | Guichard et al. | 370/395.3 |
| 2007/0189291 A1 | 8/2007 | Tian | 370/390 |
| 2008/0002699 A1 | 1/2008 | Rajsic | 370/392 |
| 2008/0037117 A1 | 3/2008 | Tanaka | 370/471 |
| 2008/0075016 A1 | 3/2008 | Ashwood-Smith | 370/252 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Good | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0080431 A1* | 3/2009 | Rekhter | H04L 12/4641 370/392 |
| 2009/0135815 A1 | 5/2009 | Pacella | 370/389 |
| 2010/0063983 A1 | 3/2010 | Groarke et al. | 707/803 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0284309 A1 | 11/2010 | Allan et al. | 370/256 |
| 2011/0228780 A1 | 9/2011 | Ashwood-Smith | 370/392 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carnet et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1 | 8/2012 | Kini | 370/228 |
| 2012/0307629 A1 | 12/2012 | Vasseur | 370/228 |
| 2013/0003728 A1 | 1/2013 | Kwong et al. | 370/389 |
| 2013/0077476 A1 | 3/2013 | Enyedi | 370/225 |
| 2013/0077626 A1 | 3/2013 | Keesara et al. | 370/390 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0341222 A1 | 11/2014 | Filsfils et al. | 370/395.5 |
| 2014/0369356 A1 | 12/2014 | Bryant et al. | 370/392 |

OTHER PUBLICATIONS

Previdi, Stefano B.; "Segment Routing Using a Remote Forwarding Adjacency Identifier"; U.S. Appl. No. 14/334,300, filed Jul. 17, 2014; consisting of Specification, Claims and Abstract (23 pages); and Drawings (8 sheets).

Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).

Filsfils, C. et al., Cisco Systems, Inc., "Segment Routing Interoperability with LDP", draft-filsfils-spring-segment-routing-ldp-interop-01.txt; Apr. 18, 2014, pp. 1-16.

Filsfils, C., et al., Cisco Systems, Inc., "Segment Routing Architecture," draft-filsfils-rtgwg-segment-routing-01, Network Working Group, Internet-Draft, Oct. 21, 2013, pp. 1-28.

Gredler, H. et al., hannes@juniper.net, IETF87, Berlin, "Advertising MPLF LSPs in the IGP," draft-gredler-ospf-label-advertisement, May 21, 2013; pp. 1-14.

Kompella, K. et al., "Virtual Private LAN Service (VPLS) Using BGP for Auto-Discovery and Signaling," Network Working Group, Request for Comments 4761, Juniper Networks, Jan. 2007, pp. 1-28.

Previdi, S. et al., Cisco Systems, Inc., "Segment Routing with IS-IS Routing Protocol, draft-previdi-filsfils-isis-segment-routing-02," Internet-Draft Mar. 20, 2013; pp. 1-27.

Tian, A.J., et al., Redback Networks, "Source Routed MPLS LSP Using Domain Wide Label," draft-tian-mpls-lsp-source-route-01. txt, Network Working Group, Internet Draft, Jul. 2004, pp. 1-12.

Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).

(56) References Cited

OTHER PUBLICATIONS

Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); and Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Cisco Systems, Inc., "Introduction to Intermediate System-to-Intermediate System Protocol," publicshed 1992-2002; pp. 1-25.
Eckert, T., "Traffic Engineering for Bit Index Explicit Replication BIER-TE, draft-eckert-bier-te-arch-00," Network Working Group, Internet—Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet—Draft, Jul. 5, 2015, pp. 1-23.
Li, T., et al., Redback Networks, Inc., "IS-IS Extensions for Traffic Engineering," Network Working Group, Request for Comments 5305, Oct. 2008, 17 pages.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Aggarwal, R. and Y. Rekhter, Juniper Networks; E. Rosen, Cisco Systems, Inc.; "MPLA Upstream Label Assignment and Context Specific Label Space;" Network Working Group; Internet Draft; Jan. 2005; pp. 1-8.
Awduche, Daniel O., et al., "RSVP-TE: Extensions to RSVP for LSP Tunnels," Network Working Group, Internet—Draft, Feb. 2001, pp. 1-12.
Awduche, Daniel O., et al., "RSVP-TE: Extensions to RSVP for LSP Tunnels," Network Working Group, Request for Comments 3209, Dec. 2001, pp. 1-61.
Backes, P. and Rudiger Geib, "Deutsche Telekom AG's Statement About IPR Related to Draft-Geig-Spring-OAM-Usecase-01," Aug. 23, 2012, pp. 1-2.
Bryant, S. et al., Cisco Systems, "IP Fast Reroute Using Tunnels-draft-bryant-ipfrr-tunnels-03", Network Working Group, Internet—Draft, Nov. 16, 2007, pp. 1-30.
Bryant, S., et al., Cisco Systems, "Remote LFA FRR," draft-ietf-rtgwg-remote-lfa-04, Network Working Group, Internet—Draft, Nov. 22, 2013, pp. 1-24.
Crabbe, E., et al., "PCEP Extensions for MPLS-TE LSP Protection With Stateful PCE Draft-Crabbe-PCE-Stateful-PCT-Protection-00," Network Working Group, Internet—Draft, Apr. 2013, pp. 1-12.
Crabbe, E., et al., Stateful PCE Extensions for MPLS-TE LSPs, draft-crabbe-pce-statement-pce-mpls-te-00; Network Working Group, Internet—Draft, Apr. 15, 2013, pp. 1-15.
Deering, S., et al., Cisco, Internet Protocol, Version 6 (IPv6) Specification, Network Working Group, Request for Comments 2460, Dec. 1998, pp. 1-39.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Enginerring—Resource Reservation Protocol-Traffic Enginerring (RSVP-TE) Extensions, Newtork Working Group, Request for Comments 5151, Feb. 2008.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.

Filsfils, C., et al., Cisco Systems, Inc., "Segment Routing Architecture," draft-filsfils-rtgwg-segment-routing-00, pp. 1-28.
Frost, D., et al., Cisco Systems, Inc., "MPLS Generic Associated Channel (G-Ach) Advertisement Protocol," draft-ietf-mpls-gach-adv-00, Internet—Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet—Draft, Jun. 7, 2013, pp. 1-17.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case," IETF 87, Gerlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS data plan moniotoring System," draft-geib-spring-oam-usecase-01; Internet—Draft, Feb. 5, 2014, pp. 1-10.
Gredler, H., et al., Juniper Networks, Inc., "Advertising MPLS Labels in IS-IS draft-gredler-isis-label-advertisement-00," Internet—Draft; Apr. 5, 2013; pp. 1-13.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet—Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet—Draft, Mar. 12, 2013, pp. 1-27.
Raszuk, R., NTT 13, "MPLS Domain Wide Labels," draft-raszuk-mpls-domain-wide-labels-00, MPLS Working Group, Internet—Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.

\* cited by examiner

| Segment ID | Egress Int ID | Stack Ins |
|---|---|---|
| 64 | 1 | Cont |
| 65 | 1 | Cont |
| 66 | -- | Inc |
| 67 | 2 | Cont |
| 68 | 1 | Cont |
| 69 | 3 | Cont |
| 70 | 3 | Cont |
| 71 | 3 | Cont |
| 72 | 2 | Cont |

*FIG. 3*

INDEXED SEGMENT ID

RELATED APPLICATIONS

This application claims the domestic benefit under Title 35 of the United States Code §119(e) of U.S. Provisional Patent Application Ser. No. 61/776,463, entitled "Segment Routing," filed Mar. 11, 2013, which is hereby incorporated by reference in its entirety and for all purposes as if completely and fully set forth herein.

BACKGROUND

Packet forwarding is a process of relaying packets from one communication link to another by nodes in a network. A packet is a formatted unit of data that typically contains control information and payload data. Control information may include: source and destination IP addresses, error detection codes like checksums, sequencing information, etc. Control information is typically found in packet headers and trailers, with payload data in between. Network nodes may take form in one or more routers, one or more bridges, one or more switches, or any other suitable communications processing device.

At network nodes where multiple outgoing links are available, the choice of link to use for packet forwarding requires a decision process that, while simple in concept, can be complex. Since packet forwarding decisions are handled by nodes, the total time required for this can become a major limiting factor in overall network performance.

Segment routing (SR) is one mechanism that nodes can use to forward packets. Segment routing involves attaching one or more segment IDs (segment IDs) to a packet. Segment routing capable nodes determine how to forward a packet based on the segment IDs. This stands in stark contrast to traditional Internet Protocol (IP) routing in which packet forwarding decisions are made using IP addresses contained within packets. Since nodes use segment IDs, there is no need for nodes to examine the contents (e.g., IP addresses) of packets to make packet forwarding decisions.

However, one constraint of classic SR networks is that all nodes in a given SR network must be able to determine what segment is referred to by a given segment ID. That is, all nodes use a common range of segment IDs, and a segment ID assigned to a particular segment is allocated from that range and must mean the same thing (identify the particular segment) to all nodes in the SR network. However, it may be inconvenient or impossible for some nodes to utilize the common range of segment IDs, for example due to varying capabilities of the nodes. If a node in the SR network does not recognize and use the common range of segment IDs used by other nodes the node may be unable to use SR to forward packets.

BRIEF DESCRIPTION OF THE DRAWINGS

The present disclosure may be better understood, and its numerous objects, features, and advantages made apparent to those skilled in the art by referencing the accompanying drawings.

FIG. 3 is a graphical representation of an example forwarding table stored in a node.

DETAILED DESCRIPTION

Overview

Figure 1:
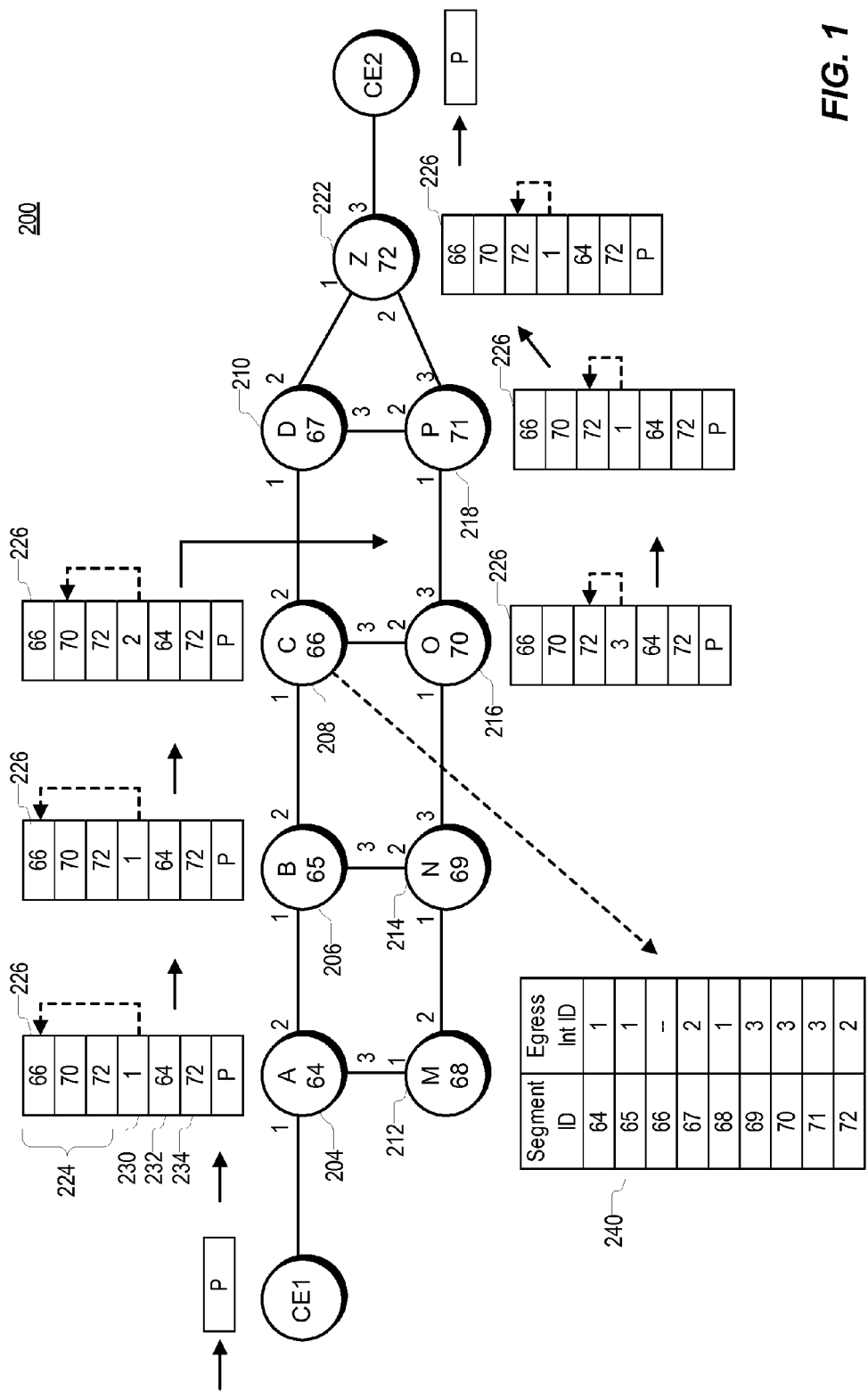
FIG. 1 is a block diagram illustrating an example network.

An apparatus and method are disclosed for segment routing (SR) using indexed segment IDs. In one embodiment, nodes in a given administrative domain calculate indexed segment IDs using various ranges of segment ID values, which are not necessarily globally unique, and index values, which are globally unique. As used herein, the term node indicates a node that is capable of using SR to forward packets, unless otherwise indicated.

Segment Routing

Segment routing (SR) is a mechanism in which packets can be forwarded using SR forwarding tables and segment IDs attached to packets. SR enables very fast and simple forwarding engines in the dataplane of nodes. SR is not dependent on a particular Open Systems Interconnection (OSI) model data link layer technology to forward packets.

SR can be employed in provider networks. Packets enter an SR enabled provider network via an ingress provider edge (PE) node, travel hop-by-hop along a segment-switched path (SSP) that includes one or more core nodes, and exit the provider network via an egress PE node. The remaining disclosure will make reference to an autonomous, provider network that operates under one administrative network domain. In general a provider network may contain a contiguous set of nodes.

Segment IDs are short (relative to an IP address or a FEC), fixed-length identifiers. Segment IDs may correspond to topological segments of a provider network or services provided by nodes thereof. Topological segments can be one-hop paths to nodes, or they can be multi-hop paths to nodes. Topological segments act as sub-paths that can be combined to form an SSP. Stacks of segment IDs can represent SSPs as will be described below. SSPs can be associated with forwarding equivalency classes (FECs). Thus segment ID stacks may correspond to FECs.

There are several types of segment IDs including but not limited to: nodal segment IDs, adjacency segment IDs, and service segment IDs. A nodal segment ID represents a one-hop or a multi-hop shortest path (SPT) within the provider network to an associated node.

In classic SR systems, nodal segment IDs are assigned to respective nodes within the provider network such that no two nodes in the provider network are assigned the same nodal segment ID. To achieve this, all assigned nodal segment IDs are selected from a predefined segment ID range (e.g., [64, 5000]) for the provider network. In this example, the first available segment ID is 64, and the contiguous set of values between and including 64 and 5000 forms the segment ID range.

However, in some network domains, it may be impractical or impossible for all nodes in the network domain to ensure that all values in the predefined segment ID range are available for use as nodal segment IDs. For example, a node may have already allocated the values in the predefined segment ID range for other purposes, or the node may have fewer values available to use as nodal segment IDs due to physical limitations, such as register size, and the like. Nodes from different vendors or manufacturers may use different ranges. In classic SR systems, a node that does not support the full predefined segment ID range may be configured such that the node is excluded from participation in SR. That node may be unable to recognize and forward packets using SR. As an example, consider the following scenario in which a provider network defines a segment ID range of [64, 5000] as being reserved for nodal segment IDs. A node joins the provider network, but the node cannot reserve the full range, because the node reserves the values [4000, 5000] for other purposes. If the node were to receive a packet that was traversing a nodal segment that has a nodal segment ID of 4500, the node would be unable to forward the packet, since the node would be unable to recognize the nodal segment ID. In this case, the node will be excluded from participating in SR, or will be excluded from the shortest path associated with nodal segment ID 4500.

Nodal segment IDs can be mapped in memory to identifiers corresponding to the node associated with the nodal segment ID. For purposes of explanation only, nodal segment IDs are mapped to respective node loopback prefix IP addresses, and are sometimes known as prefix segment IDs. One of ordinary skill understands that node loopback prefix IP addresses (node prefixes for short) distinguish the nodes from each other within the provider network. The node prefixes can be used by link state protocols such as open shortest path first (OSPF) or intermediate system to intermediate system (IS-IS), or modifications thereof, operating in the control plan of a node to identify egress interfaces for shortest paths (SPTs) to respective nodes. Once identified, the SPT egress interfaces can be mapped to nodal segment IDs within an SR forwarding table as the SR forwarding table is created or subsequently updated.

Nodes can advertise SR related values to other nodes in the provider network using a protocol such as interior gateway protocol (IGP) or a modification thereof. Nodes can use the SR related values, such as nodal segment IDs, adjacency segment IDs, service segment IDs, node prefixes, and/or other information to create or update SR forwarding tables and/or segment ID stacks. The control planes of a node can receive and use some or all of the SR related values and a link-state protocol such as IS-IS or OSPF, or modified versions thereof, to identify egress interfaces for SPTs to nodes. An SPT egress interface, once identified, can be mapped to its respective nodal segment ID in the node's SR forwarding table.

Segment Routing enables segment-switched paths (SSPs), which can be used for transporting packets through the provider network. SSPs are typically associated with FECs, and can be established for a variety of purposes, such as to guarantee a certain level of performance. Packets associated with the same FEC will typically follow the same SSP of nodes through the provider network. Nodes in SSPs make forwarding decisions based on segment IDs, not based on the contents (e.g., destination IP addresses) of packets. As such, packet forwarding in SSPs is not dependent on a particular Layer 2 technology.

Nodes can use SR related values they receive in advertisements from other nodes in order to create ordered lists of segment IDs (i.e., segment ID stacks). Segment ID stacks correspond to SSPs, respectively, that forward packets between nodes (e.g., SR enabled ingress and egress nodes) in the provider network. Segment IDs in a segment ID stack may correspond to respective segments or sub paths of a corresponding SSP. When an SR source node (e.g., an SR ingress PE node) receives a packet, the node can calculate a FEC for the packet. The SR source node uses the FEC it calculates to select a segment ID stack mapped thereto. The SR source node can add the selected segment ID stack to a header, and then attach the header to the packet. The packet with attached segment ID stack can traverse the segments of the SSP in an order that corresponds to the list order of the segment IDs in the stack. A forwarding engine operating in the dataplane of each node can use a segment ID within the segment ID stack and an SR forwarding table in order to forward the packet and header to the next node in the SSP. As the packet and attached header are forwarded along the SSP in a hop-by-hop fashion, the attached stack of segment IDs remains unchanged in one embodiment.

To illustrate general concepts of SR, FIG. 1 shows: a portion of an example SR enabled provider network 200 that is in data communication with customer edge routers CE1 and CE2; an example header 226 containing an example segment ID stack 224; and an example SR forwarding table 240.

Provider network 200 includes nodes 204-222. In one example, nodes 204-222 are implemented as SR enabled routers. Nodes 204-210 are assigned unique nodal segment IDs 64-67, respectively, nodes 212-218 are assigned unique nodal segment ID's 68-71, respectively, and node 222 is assigned unique nodal segment ID of 72. Each of the nodes 204-222 has interfaces that are identified as shown. For example, node 204 has three interfaces designated 1-3, respectively. Each of the nodes 204-222 is assigned a node prefix that is unique within network 200. Node prefixes A-D are provided for nodes 204-210, respectively, node prefixes M-P are provided for nodes 212-218 respectively, and node prefix Z is provided for node 222. As noted above, these node prefixes are unique within network 200 and can be used for several purposes such as calculating the topology of network 200, which in turn can be used to calculate SPTs. Nodes 204-222 can also assign locally significant adjacency segment IDs and/or service segment IDs.

Each of nodes 204-222 can advertise its service segment ID, adjacency segment ID(s), nodal segment ID, and node prefix to the other nodes in network 200. For example, node 208 can generate and send one or more advertisements that map nodal segment ID 66 to node prefix C. Using the advertisements they receive, the control planes of nodes 204-222 can generate respective SR forwarding tables for use in the data planes. For example, node 208 can generate example SR forwarding table 240 using a link state protocol and the advertisements that node 208 receives directly or indirectly from nodes 204, 206, 210, 212-218, and 222. Example SR forwarding table 240 maps nodal segment IDs such as 64, 65, 67, 70, and 72, to node 208 interface identifiers 1, 1, 2, 3, and 2, respectively, which are the SPT egress interface identifiers determined by node 208 for node prefixes A, B, D, O, and Z respectively In addition to creating SR forwarding tables based on received segment ID advertisements, several nodes 204-222 can calculate segment ID stacks for respective SSPs. For example, node 204 calculates example segment ID stack 224 for an SSP between ingress node 204 and egress node 222. Example segment stack 224 can be calculated for a particular FEC (e.g., FEC F). Example segment stack 224 includes three segment IDs: nodal segment IDs 66, 70, and 72 advertised by nodes 208, 216, and 222, respectively. Segment ID stack 224 corresponds to an SSP in which packets flow in order through nodes 204, 206, 208, 216, 218, and 222.

Node 204 is an ingress PE node for packets received from customer edge router CE1. In response to receiving a packet, ingress node 204 can calculate a FEC based upon, for example, one or more IP addresses contained within the packet. After calculating the FEC for the packet, node 204 can select a segment ID stack, which is mapped to the calculated FEC from a table stored in memory (not shown). For example, node 204 can calculate FEC F for packet P based on the destination IP address in packet P. As noted above, FEC F is mapped to example segment ID stack 224. Node 204 is configured to create a header such as header 226, for packet P that contains the selected segment ID stack 224. Example header 226, as shown in FIG. 1, also includes an active segment ID pointer 230. The active segment ID pointer points to or identifies a segment ID (hereafter the active segment ID) in the segment ID stack that a node should consider when the node receives the packet and attached header. When the header is first created the active segment ID pointer 230 should be set to 1, thereby pointing to the first segment ID of the segment ID stack. In some embodiments, a header may include identifications (e.g., respective nodal segment IDs or node prefixes) of the source and destination (e.g., ingress and egress nodes) for the associated SSP. In FIG. 1, nodal segment IDs are used for source identification 232 and destination identification 234 in example header 226. Additional information such as TTL may be included in headers.

Example segment ID stack 224 lists segment IDs that correspond to one-hop and multi-hop segments of provider network 200 that packets with segment ID stack 224 traverse to reach egress node 222. The segments collectively form the SSP corresponding to segment ID stack 224. Once header 226 is attached to packet P, ingress node 204 may access a SR forwarding table (not shown) using the active segment ID of the segment ID stack 224. Again, the active segment ID is identified by the active segment ID pointer 230. In the embodiment shown in FIG. 1, active segment ID pointer 230 is set to 1 at ingress node 204. Accordingly, the active segment ID within header 226 is nodal segment ID 66. Node 204 accesses its SR forwarding table using nodal segment ID 66 to read egress interface identifier 2 mapped, which is the egress interface for the SPT to the node that is assigned nodal segment ID 66.

Figure 2:
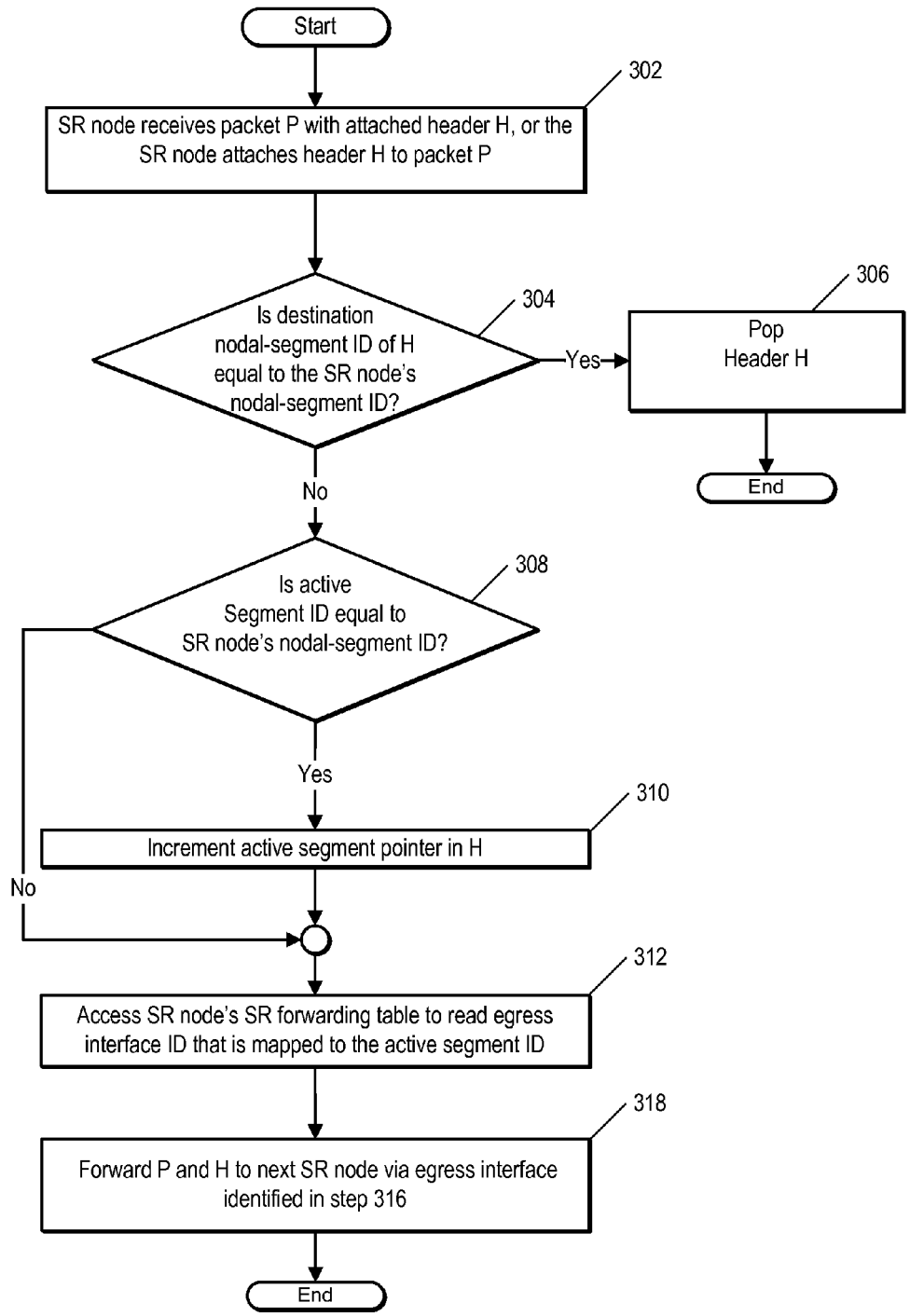
FIG. 2 is a flow chart illustrating an example process employed by a node of FIG. 1.

With continuing reference to FIG. 1, FIG. 2 illustrates example aspects of packet forwarding using SR according to one embodiment. The operations depicted in FIG. 2 can be performed by one or more components of node 1600, shown in FIG. 16, and/or can be implemented in software as computer executable instructions that, when executed, perform the operations depicted in FIG. 2. More particularly, FIG. 2 illustrates an example method performed by a node in a provider network like that shown in FIG. 1 in response to receiving a packet with an attached header H, or in response to attaching a header H to a packet, as shown at 302. Next is a determination of whether the node is the destination node of the SSP. There are many ways this can be implemented. For example, if the active segment ID pointer cannot be incremented because the active segment ID is the last segment ID in the segment ID stack, the node is the destination. In the embodiment shown if the destination nodal segment ID in header H equals the node's nodal segment ID, as determined at 304, the node is the destination, and the node detaches header H, at 306, before forwarding the packet using, for example, IP routing.

Otherwise, the node proceeds to determine the active segment ID in the segment ID stack. More particularly, the node reads the active segment ID pointer to identify the active segment ID of the segment ID stack. The node then determines, at 308, whether the active segment ID is equal to the nodal segment ID assigned to the node. This can be accomplished by the node by comparing the active segment ID with the nodal segment ID assigned to the node. If the node determines that the active segment ID is the node's nodal segment ID, the process proceeds to 310 where the node increments the active segment ID pointer, which in turn identifies the next or new active segment ID.

Presuming the active segment ID does not equal the node's nodal segment ID at 308, the process proceeds to 312 where the node accesses its SR forwarding table to read the egress interface ID that is mapped to the active segment ID. At 318 the node forwards packet P and attached header H to the next node via the egress interface that is identified in step 312.

It is noted that in an alternative embodiment, an active segment ID pointer is not needed. In this alternative embodiment, the segment ID at the top of the segment ID stack is considered the active segment ID, and segment IDs can be popped from the segment ID stack at 306 instead of incrementing a pointer in the header as shown. In this alternative embodiment, however, the segment ID stack changes substantially as the packet and header traverse the SSP.

With continuing reference to FIG. 2, FIG. 1 shows packet P and the state of active segment pointer 230 as packet P and header H are forwarded by nodes of the SSP corresponding to segment ID stack 224. As shown, pointer 230 does not change as nodes 204 and 206 forward packet P and header 226. However, the active segment pointer 230 is incremented at node 208 in accordance with step 306. That is, the nodal segment having nodal segment ID 66 ends at node 208, and the next segment in the segment ID stack becomes the active segment.

The nodal segment having nodal segment ID 70 ends at node 216, and node 216 increments the active segment pointer again such that the next segment in the segment stack (e.g., segment 72) becomes the active segment. Nodes 216 and 218 forward packet P and header 226 to node 222. SR egress PE node 222 recognizes the destination nodal segment ID as its own nodal segment ID, and as a result node 222 detaches header 226 from packet P in accordance with step 306. Eventually, node 222 may employ traditional IP routing and forward packet P to CE2 based on routing table lookup using the destination IP address within packet P.

FIG. 2 illustrates an example method employed by nodes when forwarding a packet P with attached header H using, for example, the SR forwarding table 240 shown within FIG. 1. Other SR forwarding methods are contemplated. For example, one alternative method for forwarding packets in nodes employs a slightly different SR forwarding table. In this alternative embodiment, a stack instruction can be added to the node forwarding table. This stack instruction, when implemented can change the active segment pointer within header H without having to go through a comparatively complex method like that shown within FIG. 2.

FIG. 3 illustrates an example SR forwarding table that can be generated by node 208 that includes stack instructions mapped to segment IDs. In one embodiment, the stack instructions are limited to increment (Inc.), which instructs the node to increment the active segment pointer, and continue (Cont.), which instructs the node to leave the active segment pointer ID as is. Other stack instructions are contemplated. As can be seen in FIG. 3, example table 241 includes nodal segment ID 66, which is assigned to node 208. This segment ID, however, is not mapped to an egress interface identifier in SR forwarding table 241. Rather, nodal segment ID 66 is mapped to null.

Figure 4:
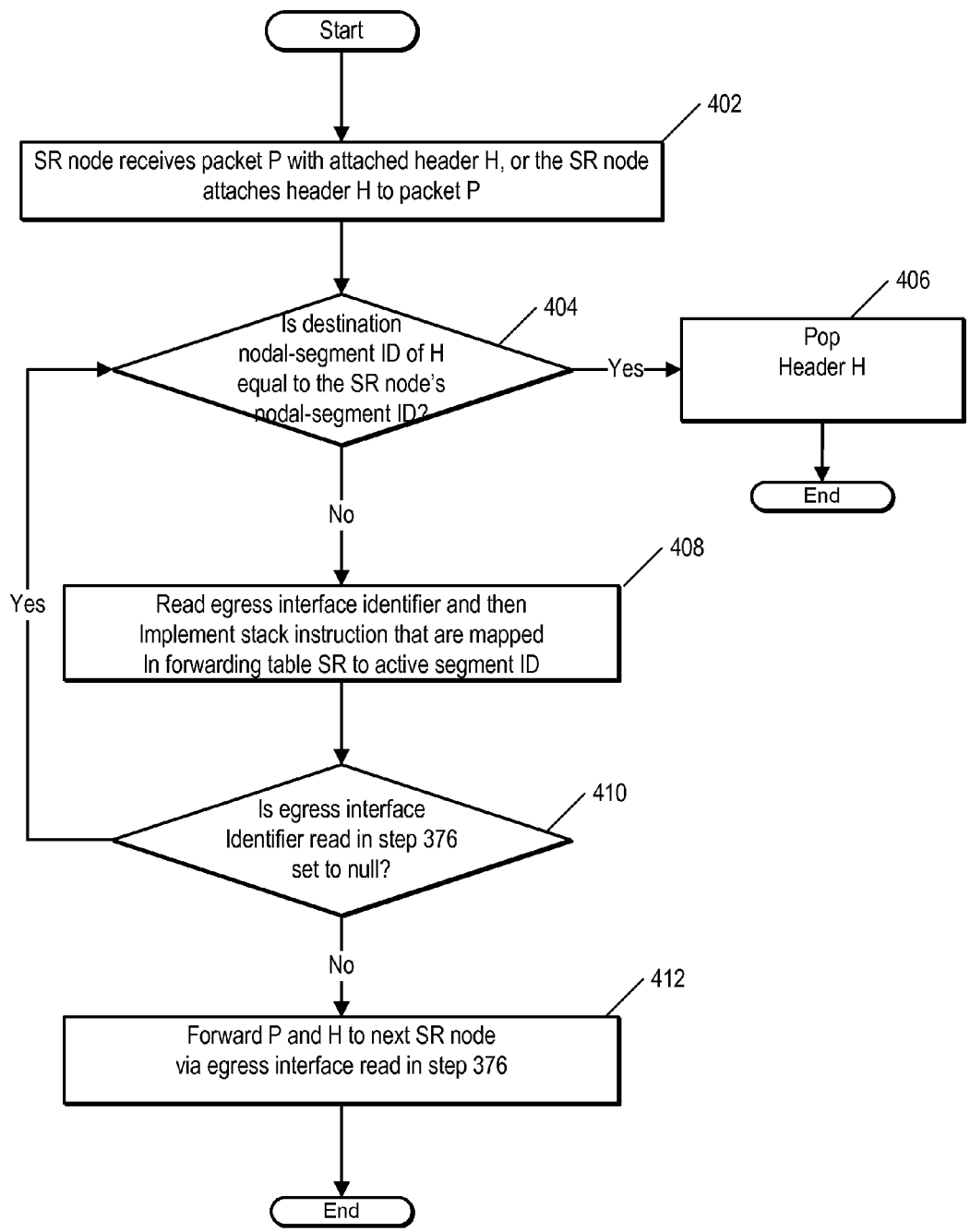
FIG. 4 is a flow chart illustrating an example process employed by a node of FIG. 1.

With continuing reference to FIGS. 1 and 3, FIG. 4 illustrates an alternative method that can be employed by a node in FIG. 1 using the alternative SR forwarding table such as that shown within FIG. 3. The operations depicted in FIG. 4 can be performed by one or more components of node 1600, shown in FIG. 4, and/or can be implemented in software as computer executable instructions that, when executed, perform the operations depicted in FIG. 5. The process in FIG. 4 starts at 402 when a node receives a packet P with attached header H such as header 226 shown within FIG. 1, or when the node attaches header H to packet P. The node determines at 404 whether the destination-nodal segment ID 234 within H is equal to the node's nodal segment ID. If these two nodal segment IDs are equal, the packet has reached the last node in the SSP, and as a result the node pops header H at 406 before forwarding packet P to, for example, customer edge router such as CE2.

However, if the destination nodal segment ID does not equal the node's nodal segment ID, the process proceeds to 408 where the node reads the egress interface identifier mapped to the active segment ID within the SR forwarding table. Then the node implements the stack instruction that is mapped to the active segment ID. Again, in this embodiment, the stack instruction, which is implemented by the forwarding engine in one embodiment, increments the active segment pointer if the mapped instruction is set to increment, or does not increment the active segment pointer if the mapped instruction is set to continue. At 410, the node determines whether the egress interface identifier that was read in step 408 is set to null. Again, an egress interface identifier is set to null when it is mapped to the node's nodal segment ID. If the egress interface identifier read in step 408 is set to null, the node repeats step 408. Otherwise, the node forwards packet P and attached header H to the next node via the egress interface that was read in step 408 as shown in step 412.

Figure 5:
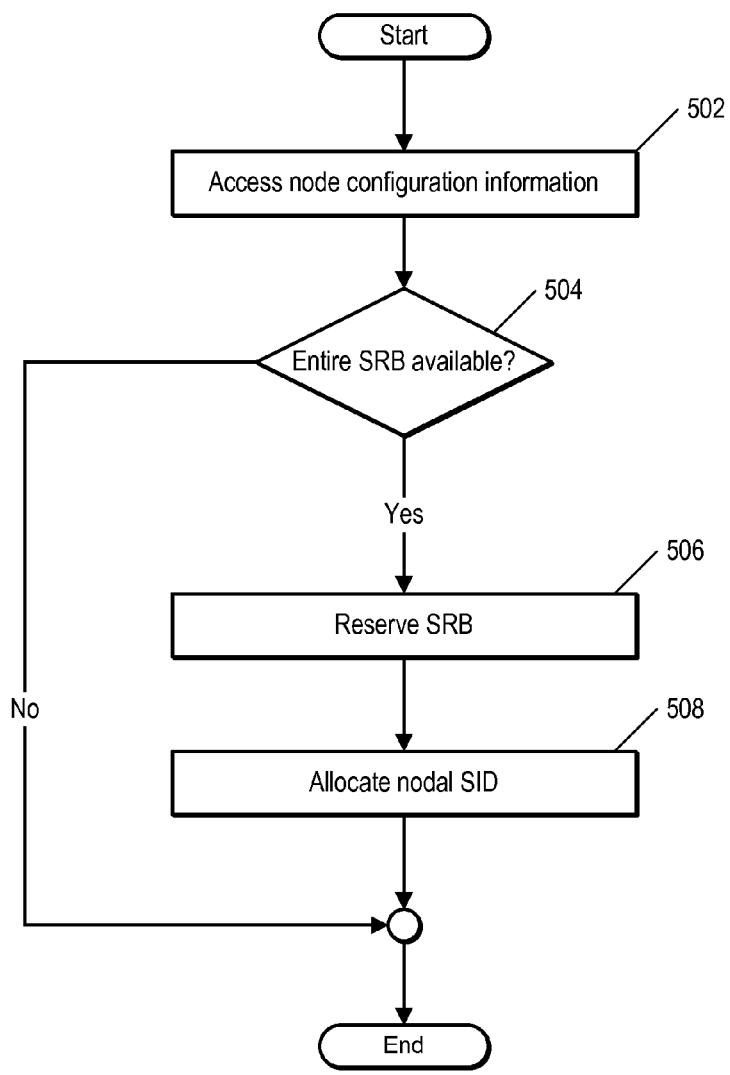
FIG. 5 is a flow chart illustrating an example process of configuring a node of FIG. 1.
Figure 6:
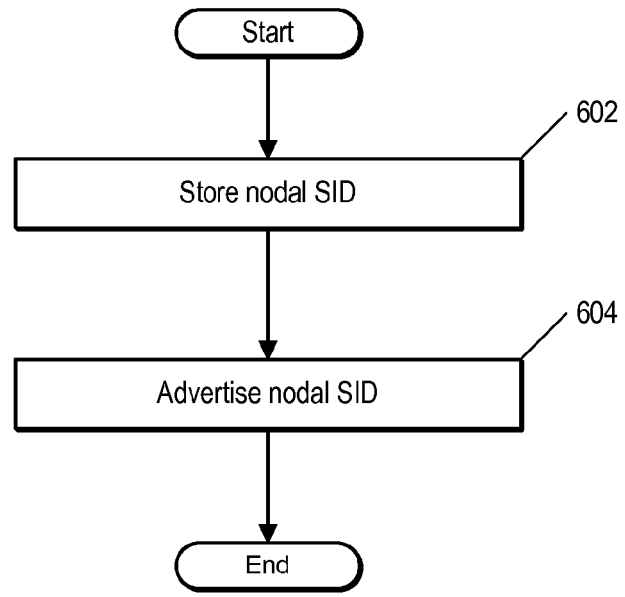
FIG. 6 is a flow chart illustrating an example process of configuring a node of FIG. 1.

Additional features shown in configuring nodes, such as the nodes in FIG. 1 to operate using SR are shown in FIGS. 5 and 6. The operations depicted in FIG. 5 can be performed, for example, in response to a node being brought online or joining a provider network, such as network 200 of FIG. 1. The operations depicted in FIG. 5 can be performed by one or more components of node 1600, shown in FIG. 16, and/or can be implemented in software as computer executable instructions that, when executed, perform the operations depicted in FIG. 5.

As noted above, classic SR networks depend upon each node in a given administrative domain agreeing to use a common range of nodal segment IDs. This common range is known as a segment routing block (SRB). At 502, an operator, such as a network administrator for the network, accesses configuration information associated with a node, e.g., a node that is joining the SR network or being configured to forward packets using SR. The operator can manually access the configuration information, e.g., via a configuration graphical user interface or central configuration tool. The access can be performed in response to a determination that the node is being added to the SR network. In one embodiment, the node sends a request to the central configuration tool. The request can include a request for a nodal segment ID and for information regarding the SRB used by the SR network. The request can be presented to the operator, or automatically responded to. Node configuration information can include, for example, information identifying values that are available to be used as segment IDs.

At 504, the operator determines whether the agreed upon SRB is available in its entirety to be used as segment IDs by the node. This step results in provisioning overhead. If not, the node is prevented from participating in SR. On the other hand, if the entire SRB is available, the operator reserves the SRB at 506. Reserving the SRB can include updating control plane information in the node to indicate that the values of the SRB are reserved for SR segment identification purposes. At 508, the operator allocates a nodal segment ID to the node. In one embodiment, the nodal segment ID is allocated according to a simple counting mechanism. That is, the SRB is sequentially traversed from the lowest value to the highest value, with subsequent nodes being assigned the next available value. Alternatively, nodal segment IDs can be allocated according to a node's position in the network domain.

FIG. 6 shows operations performed by a node being configured to join an SR network, such as network 200 of FIG. 1. The operations depicted in FIG. 6 can be performed by one or more components of node 1600, shown in FIG. 16, and/or can be implemented in software as computer executable instructions that, when executed, perform the operations depicted in FIG. 6. At 602, the node receives and stores its nodal segment ID. In one embodiment, this involves updating a control plane forwarding table. At 604, the node advertises its nodal segment ID. In one embodiment, this involves broadcasting or flooding the nodal segment ID to all other nodes in the SR network domain.

As discussed above, FIG. 1 illustrates an example network domain that includes nodes. The nodes in FIG. 1 all use an identical SRB, which enables the nodes to use globally unique segment IDs. That is, within the network domain, each node reserves the same SRB as all the other nodes and each node is assigned (e.g., by an operator) a nodal segment ID from the SRB used by the SR network. A given nodal segment ID is assigned to only one node in the network domain, and is thus globally unique. The node advertises its nodal segment ID to the other nodes in the network domain. In response to receiving the advertised nodal segment ID, each of the other nodes in the network domain updates control plane information to associate the advertised nodal segment ID with the node that advertised the nodal segment ID, and/or a prefix for that node. Thus, all nodes in the network domain use the same nodal segment ID to refer to the same nodal segment, which ends at the node that the nodal segment ID is assigned to by the operator.

Example Embodiments Using Indexed Segment Identifiers

Figure 7:
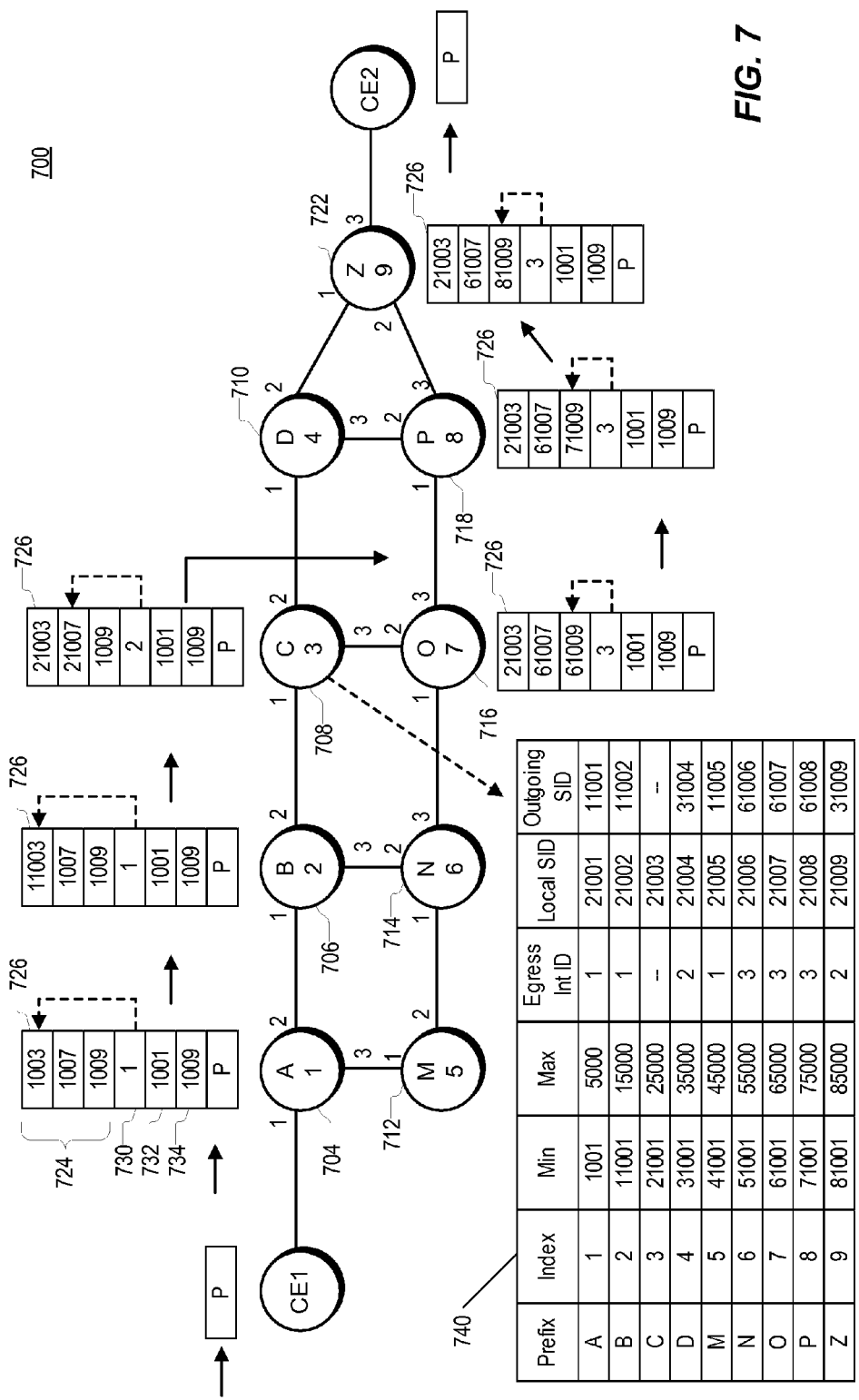
FIG. 7 is a block diagram illustrating an example network.

FIG. 7 illustrates a portion of an example provider network 700 that includes nodes that use different SRBs. This means that a nodal segment ID assigned to one of the nodes in network 700 may fall outside the SRB used by one or more of the other nodes in network 700. This also means that different nodes in network 700 may use different nodal segment IDs to refer to the same nodal segment. If a node receives a packet that includes a nodal segment ID that is not included in the node's SRB, the node does not recognize the nodal segment ID as representing a nodal segment and is unable to forward the packet along the SSP represented by the nodal segment ID. FIG. 7 and subsequent figures illustrate using an indexed nodal segment that enables nodes to forward packets along nodal segments even when the nodes are configured with non-identical SRBs. While each node in the provider network may use a different segment ID to refer to a given nodal segment, each of the different segment IDs incorporates, and/or can be derived using, an index value that is globally unique.

FIG. 7 shows an example SR enabled provider network 700 that is in data communication with customer edge routers CE1 and CE2; an example header 726 containing an example segment ID stack 724; and an example SR forwarding table 740. Provider network 700 includes nodes 704-722 coupled between customer edge routers CE1 and CE2. In one example, nodes 704-722 are implemented as SR enabled routers.

Nodes 704-210 are assigned index values 1-9, respectively. The index values are globally unique. That is, within a network domain, a given index value is assigned to one and only one node. However, more than one index value can be assigned to a given node. Doing so would enable multiple destinations per node and would result in multiple nodal segments being rooted at a single node. In any case, each index value uniquely corresponds to a particular node in the network domain. Each node also has a base SRB value and a range of SRB values. Together the base and range define the SRB for a given node. For example, [10001, 5000] indicates a base SR value of 10001 and size (range) of 5000, which identifies SR values from 10000-15000 as being included in the SRB. The SRB for a given node can include a single set of contiguous SR values, e.g., 10001-15000 or multiple sets of contiguous SR values, e.g., 10001-12500 and 17501 to 20000. The unique index values and base SR values can be used by the nodes to calculate nodal segment IDs. That is, given an index value (which corresponds to a given node, or the nodal segment associated with the node) and the node's base SR value, the nodal segment ID used by the node can be calculated (e.g., by adding the node's base SR value and the index value assigned to the node). When multiple sets are used, the sets are concatenated in increasing order to form a single set, and the index is used in the single set. For example, if a given node uses segment IDs [100-199] and [300-399], then the index 151 corresponds to the segment ID 350.

Each of the nodes 704-722 has interfaces that are identified as shown. For example, node 704 has three interfaces designated 1-3, respectively. Each of the nodes 704-722 is assigned a node prefix that is unique within network 700. Node prefixes A-D are provided for nodes 704-710, respectively, node prefixes M-P are provided for nodes 712-718 respectively, and node prefix Z is provided for node 722. These node prefixes can be used for several purposes such as calculating the topology of network 700, which in turn can be used to calculate SPTs.

Each of the nodes can advertise its node prefix, index value, and base and/or range SR values using an IGP protocol or a modification thereof. Each of these advertisements may include a node type identifier that indicates the node's type SR enabled. The advertisements allow each of the nodes 704-722 to create a topology map of provider network 700. Using a link state interior gateway protocol like IS-IS or OSPF, each of the nodes 704-722 can create a routing table that maps SPT egress interfaces to nodal segment IDs for the nodes.

Using the advertisements they receive, the control planes of nodes 704-722 can generate respective SR forwarding tables for use in the dataplanes. For example, node 708 can generate example SR forwarding table 740 using a link state protocol and the advertisements that node 708 receives directly or indirectly from nodes 704, 706, 710, 712-718, and 722. Example SR forwarding table 740 maps nodal segment IDs to node 708's interface identifiers 1, 1, 2, 3, and 2, respectively, which are the SPT egress interface identifiers determined by node 708 for node prefixes A, B, D, O, and Z respectively. The local segment ID column in forwarding table 740 includes information (nodal segment IDs) that identifies how node 708 identifies, or refers to, nodal segments. The outgoing segment ID column of forwarding table 740 includes information identifying how the next-hop node from the given egress interface refers to the corresponding nodal segment (e.g., the nodal segment ID from the next-hop node's point of view).

In addition to creating SR forwarding tables based on received segment ID advertisements, several nodes 704-722 can calculate segment ID stacks for respective SSPs. For example, node 704 calculates example segment ID stack 724 for an SSP between ingress node 704 and egress node 722. Example segment ID stack 724 can be calculated for a particular FEC (e.g., FEC F). Example segment ID stack 724 includes three segment IDs: nodal segment IDs 1003, 1007, and 1009 advertised by nodes 708, 716, and 722, respectively. Nodes 708, 716, and 722 actually advertise the index values associated with the nodes (3, 7, and 9, respectively). In response to receiving the advertised index values, node 704 calculates nodal segment IDs 1003, 1007, and 1009 based on the advertised index values and node 704's base SR value (1000). Segment ID stack 724 corresponds to an SSP in which packets flow in order through nodes 704, 706, 708, 716, 718, and 722.

Node 704 is an ingress PE node for packets received from customer edge router CE1. In response to receiving a packet, ingress node 704 can calculate a FEC based upon, for example, one or more IP addresses contained within the packet. After calculating the FEC for the packet, node 704 can select a segment ID stack, which is mapped to the calculated FEC from a table stored in memory (not shown). For example, node 704 can calculate FEC F for packet P based on the destination IP address in packet P. As noted above, FEC F is mapped to example segment ID stack 724. Node 704 is configured to create a header, such as header 726, for packet P that contains the selected segment ID stack 724.

Example header 726, as shown in FIG. 7, also includes an active segment ID pointer 730. The active segment ID pointer points to or identifies a segment ID (hereafter the active segment ID) in the segment ID stack that a node should consider when the node receives the packet and attached header. When the header is first created the active segment ID pointer 730 should be set to 1, thereby pointing to the first segment ID of the segment ID stack. In some embodiments, a header may include identifications (e.g., respective nodal segment IDs or node prefixes) of the source and destination (e.g., ingress and egress nodes) for the associated SSP. In FIG. 7, nodal segment IDs are used for source identification 732 and destination identification 734 in example header 726. Additional information such as TTL may be included in headers.

Example segment ID stack 724 lists segment IDs that correspond to one-hop and multi-hop segments of provider network 700 that packets with segment ID stack 724 traverse to reach egress node 722. The segments collectively form the SSP corresponding to segment ID stack 724. Once header 726 is attached to packet P, ingress node 704 may access a SR forwarding table (not shown) using the active segment ID of the segment ID stack 724. Again, the active segment ID is identified by the active segment ID pointer 730. In the embodiment shown in FIG. 7, active segment ID pointer 730 is set to 1 at ingress node 704. Accordingly, the active segment ID within header 726 is nodal segment ID 1003. Node 704 accesses its SR forwarding table using nodal segment ID 1003 to read egress interface identifier 2 mapped, which is the egress interface for the SPT to the node that is assigned nodal segment ID 1003.

Node 704 is configured to access a forwarding table (not shown) and determine that the next-hop node out egress interface identifier 2 is node 706. The forwarding table indicates that the minimum and maximum SR values used by node 706 for nodal segment IDs are 11001 and 15001, respectively. The current active segment ID at node 704 is 1003, which is not included in the range of SR values that node 706 recognizes as nodal segment IDs. Therefore, if node 706 receives packet P with the active segment set to 1003, node 706 will not forward packet P, since packet P has an invalid (from node 706's perspective) nodal segment ID. Node 704 is configured to calculate a nodal segment ID that: a) will be recognized as valid by a next-hop node, such as node 706 (e.g., falls within node 706's range of nodal segment IDs); and b) identifies the same nodal segment as the current active segment ID 1003. That is, node 704 is configured to calculate the nodal segment ID that represents (from the next-hop node's (e.g., node 706's) perspective) the same SPT from node 704 to node 708 that nodal segment ID 1003 does (from node 704's perspective). Node 704 is configured to swap the active segment ID (e.g, 1003) for the calculated corresponding value (e.g., 11003) in segment ID stack 724 prior to forwarding packet P. When node 706 receives packet P, the active segment ID in segment ID stack 724 is set to 11003, which is recognized by node 706 as identifying a valid nodal segment, namely the same nodal segment as is identified by nodal segment ID 1003 when used by node 704.

Figure 8:
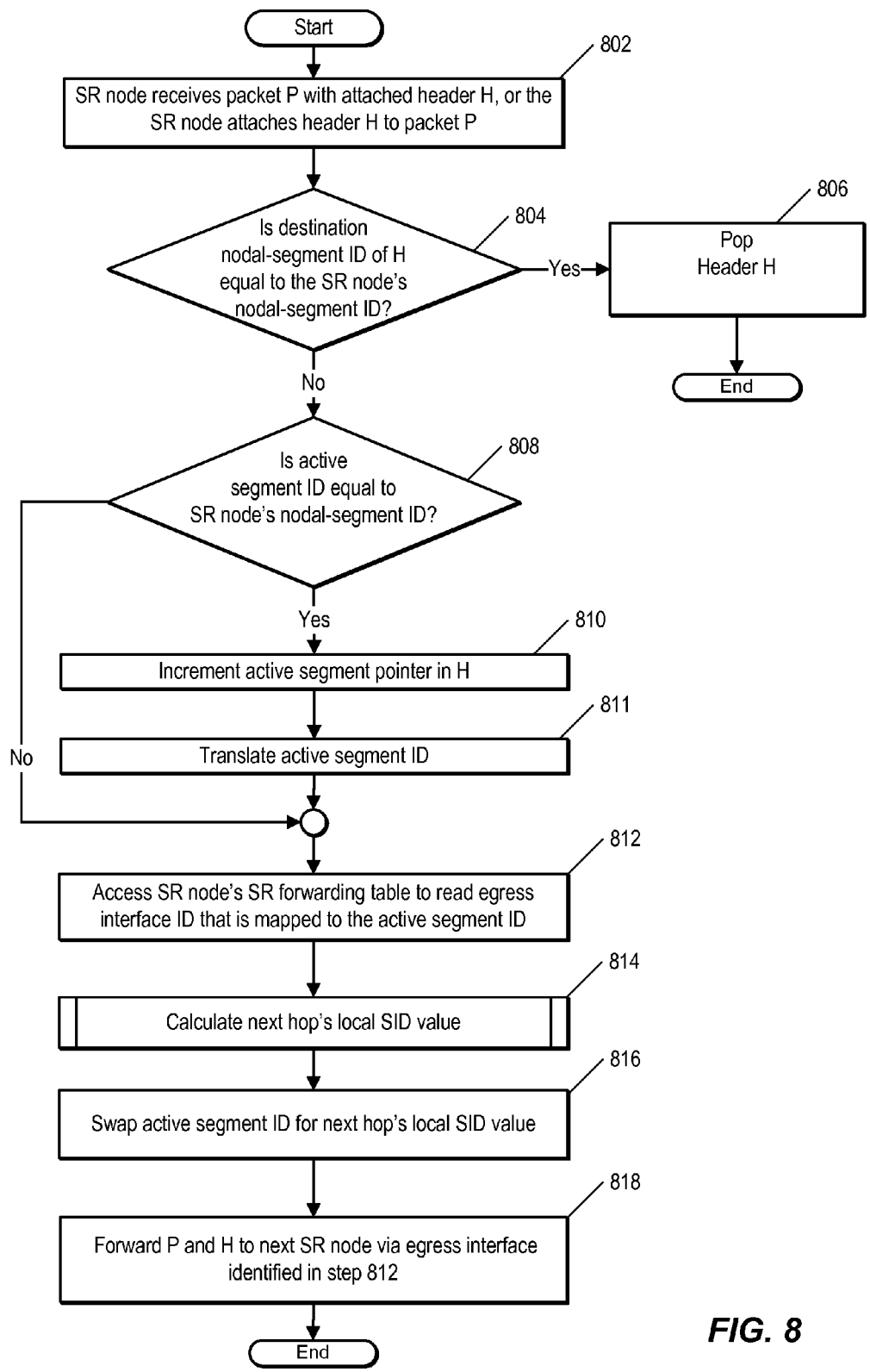
FIG. 8 is a flow chart illustrating an example process employed by a node of FIG. 7.

With continuing reference to FIG. 7, FIG. 8 illustrates example aspects of packet forwarding using SR according to one embodiment. The operations depicted in FIG. 8 can be performed by one or more components of a node, such as node 1600 of FIG. 16, and/or can be implemented in software as computer executable instructions that, when executed, perform the operations depicted in FIG. 8.

More particularly, FIG. 8 illustrates an example method performed by a node in a provider network like that shown in FIG. 7 in response to receiving a packet with an attached header H, or in response to attaching a header H to a packet, as shown at 802. Next is a determination of whether the node is the destination node of the SSP. There are many ways this can be implemented. For example, if the active segment ID pointer cannot be incremented because the active segment ID is the last segment ID in the stack, the node is the destination. In the embodiment shown if the destination nodal segment ID in header H equals the node's nodal segment ID, as determined at 804, the node is the destination, and the node detaches header H, at 806, before forwarding the packet using, for example, IP routing.

The destination nodal segment ID for packet P is shown as shown as 732 in FIG. 7 and is included in the header attached to packet P. In the example of FIG. 7, the destination nodal segment ID is 1009. However, this destination nodal segment ID is locally significant to node 704. The node that receives packet P (e.g., node 708) may not recognize 1009 as a valid nodal segment ID. In order for the node receiving packet P (the receiving node) to determine whether the destination nodal segment ID in the header H equals the receiving node's nodal segment ID, the receiving node translates the destination nodal segment ID to a destination nodal segment ID that is locally significant to the receiving node. To do so, the receiving node calculates an index value associated with the destination segment ID (e.g., by subtracting the base SR value of the first node on the SSP from the destination segment ID. Once the receiving node has calculated the index value, the receiving node calculates a locally significant segment ID (e.g., by adding the index value to the base SR value of the receiving node). Then, the receiving node determines whether the locally significant destination nodal segment ID equals the receiving node's nodal segment ID. If so, the receiving node is the destination. In one embodiment, the destination nodal segment ID can be included in the header as an index value. If the destination nodal segment ID is represented as an index value, the receiving node compares its index value with the destination index value. If the two match, the receiving node is the destination and the receiving node detaches header H at 806.

If the receiving node is not the destination, the receiving node proceeds to determine the active segment ID in the segment ID stack. More particularly, the receiving node reads the active segment ID pointer to identify the active segment ID of the segment ID stack. The receiving node then determines, at 808, whether the active segment ID is equal to the nodal segment ID assigned to the receiving node. This can be accomplished by the receiving node by comparing the active segment ID with the nodal segment ID assigned to the receiving node. If the receiving node determines that the active segment ID matches the receiving node's nodal segment ID, the process proceeds to 810 where the receiving node increments the active segment ID pointer, which in turn identifies the next or new active segment ID.

The receiving node translates the new active segment ID into a locally significant segment ID at 811. The segment stack was created at the first node of the SSP (the source node for the given SSP). Each segment ID in the stack is initially defined by the source node. As packet P traverses the SSP from node to node, the active segment ID is translated by the nodes. However, segment IDs other than the active segment ID (segment IDs that are lower in the segment ID stack) are not translated. When the active segment ID pointer is incremented to point to a new active segment, the new active segment ID is translated from the segment ID provided by the source node, to a locally significant segment ID that corresponds to the segment that is identified by the segment ID. To translate the active segment ID from a segment ID that was locally significant on the source node to a segment ID that is locally significant on the receiving node, the receiving node calculates the index value associated with the new active segment. In one embodiment, the receiving node subtracts the base SR value of the source node from the new active segment ID. The difference is the index value associated with the new active segment. The receiving node then calculates the locally significant segment ID corresponding to the new active segment (e.g., the receiving node adds the index value associated with the new active segment to the receiving node's base SR value). In one embodiment, all segment IDs in the segment stack are recalculated to be locally significant and the segment ID values are swapped at each node in the SSP, and 811 is skipped.

If the active segment ID does not equal the receiving node's nodal segment ID at 808, or subsequent to updating the active segment pointer at 810 and translating the active segment ID at 811 if the active segment ID does equal the receiving node's nodal segment ID at 808, the process proceeds to 812. At 812, the receiving node accesses its SR forwarding table to read the egress interface ID that is mapped to the active segment ID. Based on the egress interface ID, the receiving node determines the next-hop node. Once the next-hop node is known, the receiving node calculates, at 814, the next-hop node's nodal segment ID that corresponds to the active segment ID. As described in more detail with regard to FIG. 9, this involves using the next-hop node's base and the index value.

At 816, the receiving node modifies the segment stack by swapping the current active segment ID (which is locally significant to the node) with the nodal segment ID used by a next-hop node to identify the active segment. For example, in FIG. 7, node 708 receives packet P at 802 with the active segment ID pointer pointing to 21003. Node 708 determines at 804 that the destination has an index value of 9, and since node 708 has an index value of 3, node 708 knows it is not the destination of the packet. However, at 808, node 708 determines that the active segment 21003 equals node 708's nodal segment ID. This means that the first segment in the segment ID stack ends at node 708. In response to this determination, node 708 increments the active segment ID pointer, which makes the next segment in the segment ID stack (1007) the active segment. At 811, node 708 translates the active segment ID from 1007, which is locally significant to source node 704, to 21007, which is locally significant to node 708. At 812, node 708 accesses forwarding table 740 and determines that the egress interface associated with the segment ID 21007 is 3, which corresponds to node 716. At 814, node 708 calculates the segment ID used by node 716 to refer to segment ID 21007, which is 61007. Node 708 then swaps the segment ID 61007 for segment ID 21007, making segment ID 61007 the active segment.

At 818 the receiving node forwards packet P and attached header H to the next-hop node via the egress interface that is identified in step 812. It is noted that in an alternative embodiment, an active segment ID pointer is not needed. In this alternative embodiment, the segment ID at the top of the stack is considered the active segment ID, and segment IDs can be popped from the segment ID stack at 806 instead of incrementing a pointer in the header as shown.

With continuing reference to FIG. 8, FIG. 7 shows packet P and the state of active segment pointer 730 as packet P and header H are forwarded by nodes of the SSP corresponding to segment ID stack 724. As shown, pointer 730 does not change as nodes 704 and 706 forward packet P and header 726. However, the active segment pointer 730 is incremented at node 708 in accordance with step 806. That is, first nodal segment in the segment stack ends at node 708, and the next segment in the segment stack becomes the active segment.

The next nodal segment in the segment stack ends at node 716, and node 716 increments the active segment pointer again such that the next segment in the segment stack becomes the active segment. Nodes 716 and 718 forward packet P and header 726 to node 722. SR egress PE node 722 recognizes the destination nodal segment ID as its own nodal segment ID, and as a result node 722 detaches header 726 from packet P in accordance with step 806. Eventually, node 722 may employ traditional IP routing and forward packet P to CE2 based on routing table lookup using the destination IP address within packet P.

Figure 9:
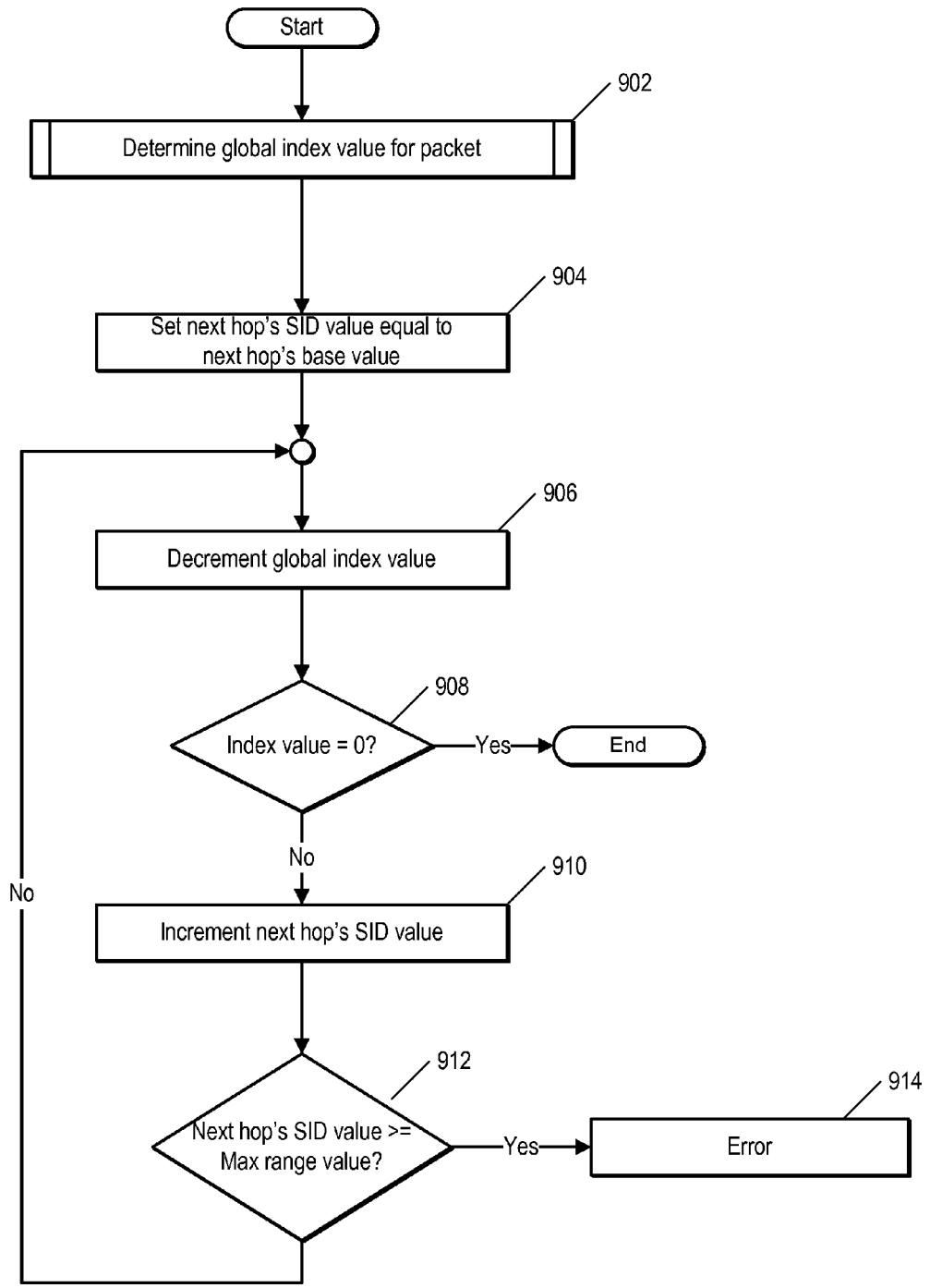
FIG. 9 is a flow chart illustrating an example process employed by a node of FIG. 7.

FIG. 9 is a flowchart illustrating an example process performed, for example, by a node in the network of FIG. 7. The operations depicted in FIG. 9 can be performed by one or more components of a node, such as node 1600 of FIG. 16, and/or can be implemented in software as computer executable instructions that, when executed, perform the operations depicted in FIG. 9. FIG. 9 shows additional details related to calculating a next-hop node's local segment ID value, as shown in 814 of FIG. 8.

At 902, the node determines a global index value for the packet. Additional details related to determining the global index value are discussed with regard to FIG. 10. The global index value will be used to calculate the next-hop's local segment ID.

The node sets the next-hop's segment ID value equal to the next-hop's base SR value at 904. The next-hop node's base SR value is determined by the node by accessing a forwarding table, such as forwarding table 740 of FIG. 7. Based on the local value of the segment ID, the node determines an egress interface ID. Based on the egress interface ID, and the topology map maintained by the node, the node is able to determine the next-hop node. Once the next-hop node is known, the node can look up the next-hop node's base SR value in the forwarding table. The next-hop node's base SR value is stored in the forwarding table as a result of having been advertised by the next-hop node.

At 906, the node decrements the global index value. If the global index value equals zero, as determined at 908, then the next-hop's local segment ID value is equal to the next-hop node's base SR value, and the method ends. Otherwise, the node increments the next-hop's segment ID value at 910. At 912, the node determines whether the next-hop's segment ID value is greater than or equal to a maximum range value associated with the next-hop node. The maximum range value associated with the next-hop node is known to the node as a result of having been advertised and stored in a forwarding table. If the next-hop's segment ID value exceeds the maximum range value, an error has occurred and is so indicated at 914. In one embodiment, an error message is generated and displayed, e.g., to an operator via a graphical user interface, or stored in an error log. In another embodiment, the packet is dropped, either with or without generating an error. If the calculated segment ID value has not exceeded the maximum range for the next-hop node, the method returns to 906, where the node decrements the global index value again. The method proceeds iteratively until the index value reaches zero, at which point the next-hop nodes segment ID value has been calculated.

Figure 10:
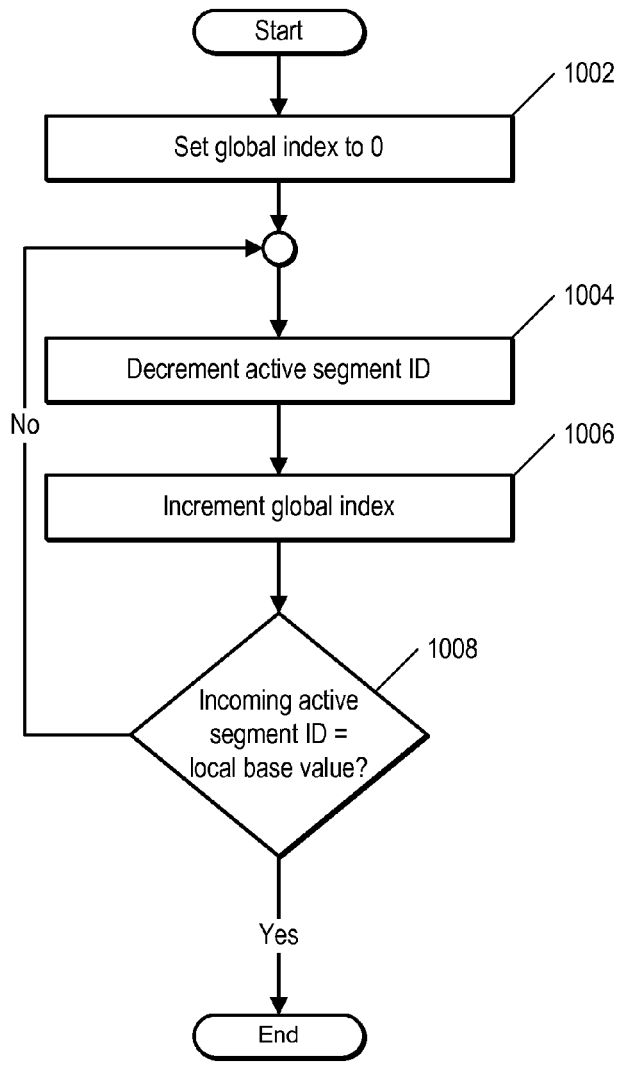
FIG. 10 is a flow chart illustrating an example process employed by a node of FIG. 7.

FIG. 10 is a flowchart illustrating additional details of an example process performed, for example, by a node in the network of FIG. 7. The operations depicted in FIG. 10 can be performed by one or more components of a node, such as node 1600 of FIG. 16, and/or can be implemented in software as computer executable instructions that, when executed, perform the operations depicted in FIG. 10. FIG. 10 shows additional details related to determining an index value for a packet, as shown at 902 of FIG. 9.

At 1002, the node sets the value of a variable corresponding to the index value to zero. At 1004, the node decrements a variable corresponding to the active segment ID. Next, the node increments the variable corresponding to the index value at 1006. At 1008, the node determines whether the value of the variable corresponding to the active segment ID is equal to the base SR value of the node. If so, the index value equals the value of the variable corresponding to the index. The operations in FIG. 10 essentially calculate a difference between the active segment ID and the local base SR value. This difference is equal to the global index value. In one embodiment, the node uses multiple ranges of segment ID values. In order to handle multiple ranges, the decrement step determines if a minimum value has been reached for a first (e.g., highest) range and if so, skips to the highest value of the next lower range of values on the next decrement operation.

Figure 11:
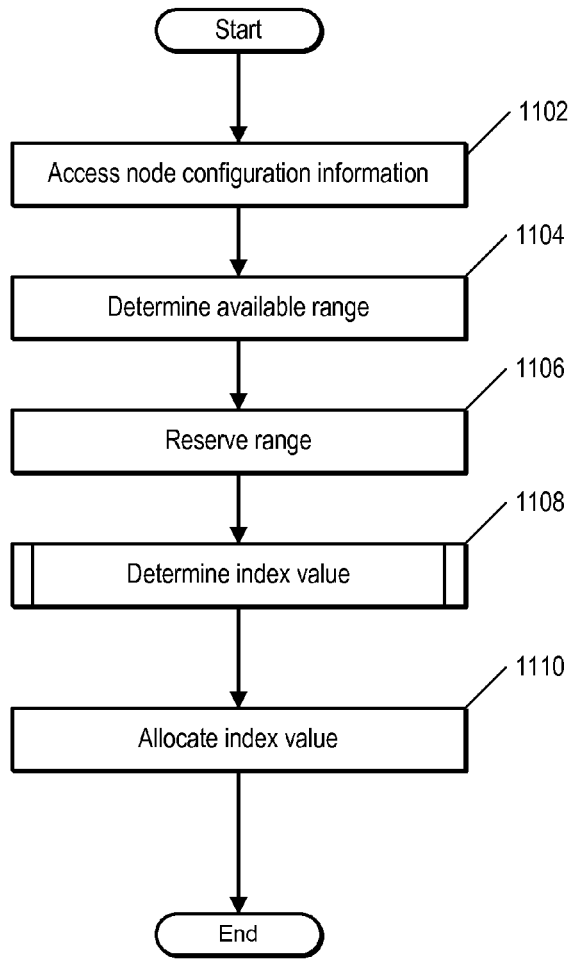
FIG. 11 is a flow chart illustrating an example process employed by a node of FIG. 7.

FIG. 11 is a flowchart illustrating operations performed in configuring a node. The operations depicted in FIG. 11 can be performed by one or more components of a node, such as node 1600 of FIG. 16, and/or can be implemented in software as computer executable instructions that, when executed, perform the operations depicted in FIG. 11. In one embodiment, the operations depicted in FIG. 11 are performed by an operator or administrator of a network of nodes, such as that shown in FIG. 7.

At 1102, the operator accesses node configuration information for the node being configured. In one embodiment, this is done in response to detecting that the node is joining the SR network. Accessing the node's configuration information involves determining a range (or ranges) of SR values that the node is configured to use in identifying nodal segments as shown at 1104. In one embodiment, this involves reading a memory or table stored on the node. In another embodiment, this involves receiving an advertisement or message request from the node. The operator also checks the available range to make sure the available range is appropriate for the network. For example, an operator can impose a minimum size on the range for the node.

At 1106, the operator reserves the range of nodal segment values for the node. The range may be unique to the node or may overlap with other ranges specified by other nodes partly or fully. The ranges for various nodes may be equal in size or may be different sizes. Reserving the range involves, in one embodiment, issuing a command to the node to add the values in the range(s) to a forwarding table on the node.

At 1108, the operator determines an index value that will be associated with the node. This is discussed in greater detail with regard to FIG. 12. Once the operator has determined the index value that will be used by the node, the operator allocates the index value at 1110. In one embodiment, this involves transmitting the global index value to the node and instructing the node to add the index value to a forwarding table on the node.

Figure 12:
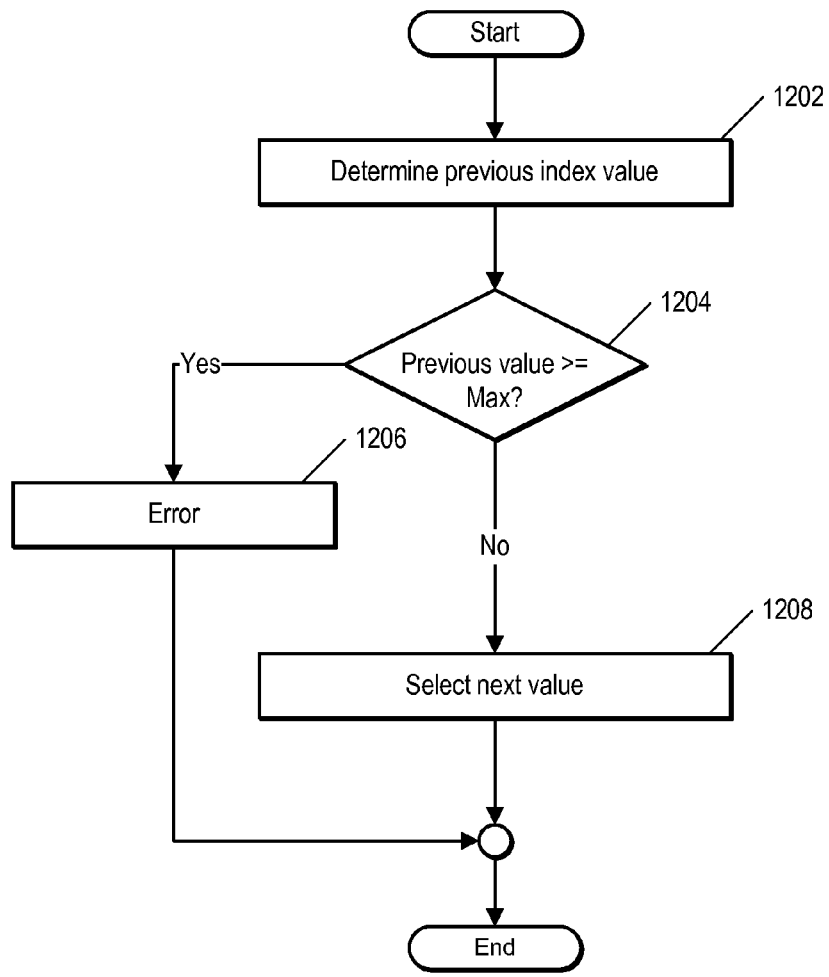
FIG. 12 is a flow chart illustrating an example process employed by a node of FIG. 7.

FIG. 12 is a flowchart showing additional details of determining an index value for a node as shown at 1108 of FIG. 11. The operations depicted in FIG. 12 can be performed by one or more components of a node, such as node 1600 of FIG. 16, and/or can be implemented in software as computer executable instructions that, when executed, perform the operations depicted in FIG. 12. In one embodiment, the operations depicted in FIG. 12 are performed by an operator or administrator of the network, such as the network shown in FIG. 7.

At 1202, the operator determines a previous index value. The previous index value, in one embodiment, is a value that was assigned to the previous or most recent node which joined, or was configured to participate in packet forwarding using SR in the provider network. In one embodiment, the first index value is one, the next is two, and so on, with the index values increasing sequentially until some predefined maximum index value is reached. For example, in one embodiment, there is some maximum number of nodal segments that can be supported. At 1204, the operator compares the previous index value with the maximum value. If the previous value is greater than or equal to the maximum value, an error has occurred and the error indicated at 1206. To indicate the error, an error message is generated and can be displayed or logged. If no error has occurred, the operator selects the next index value at 1208. At noted, this may involve simply incrementing the previous index value.

Figure 13:
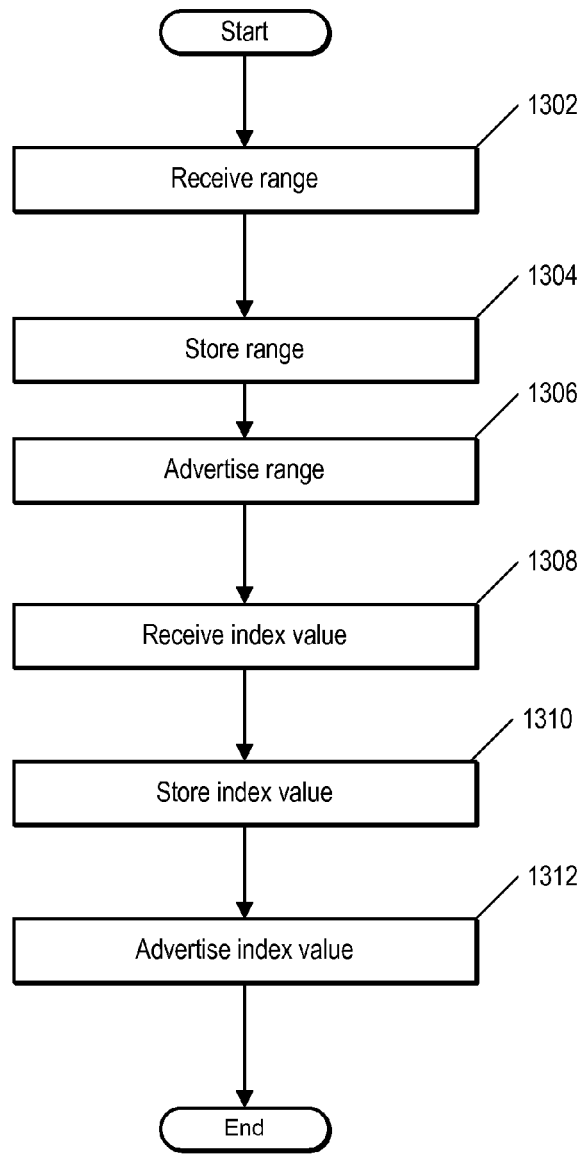
FIG. 13 is a flow chart illustrating an example process employed by a node of FIG. 7.

FIG. 13 shows operations performed by a node being configured to join an SR network, such as network 700 shown in FIG. 7. The operations depicted in FIG. 13 can be performed by one or more components of a node, such as node 1600 of FIG. 16, and/or can be implemented in software as computer executable instructions that, when executed, perform the operations depicted in FIG. 13.

At 1302, the node receives a range of SR values that can be used by the node to represent nodal segments. This range comprises the node's SRB. The range of SR values can be received from an operator or central configuration tool. The range of SR values can be based on the physical capabilities of the node, which the node detects, or based on characteristics of the provider network, as specified by the operator. The node stores this range of SR values, for example, in a forwarding table, at 1304. As noted above, multiple ranges can be utilized.

At 1306, the node advertises its range of SR values. Advertising the range of SR values involves broadcasting a message including the range of SR values to all other nodes in the network. In one embodiment only a base SR value, or the minimum SR value in the range of SR values, is advertised. Alternatively, a base SR value and a number of available SR values is advertised.

At 1308, the node receives an index value, e.g., from the operator. After storing the index value at 1310, for example in a forwarding table, the node advertises the index value at 1312. In one embodiment, the node advertises the range of SR values and the index value in a single message. Alternatively, the advertisements can comprise separate messages. The advertisement includes information that differentiates the index value from a segment ID.

Figure 14:
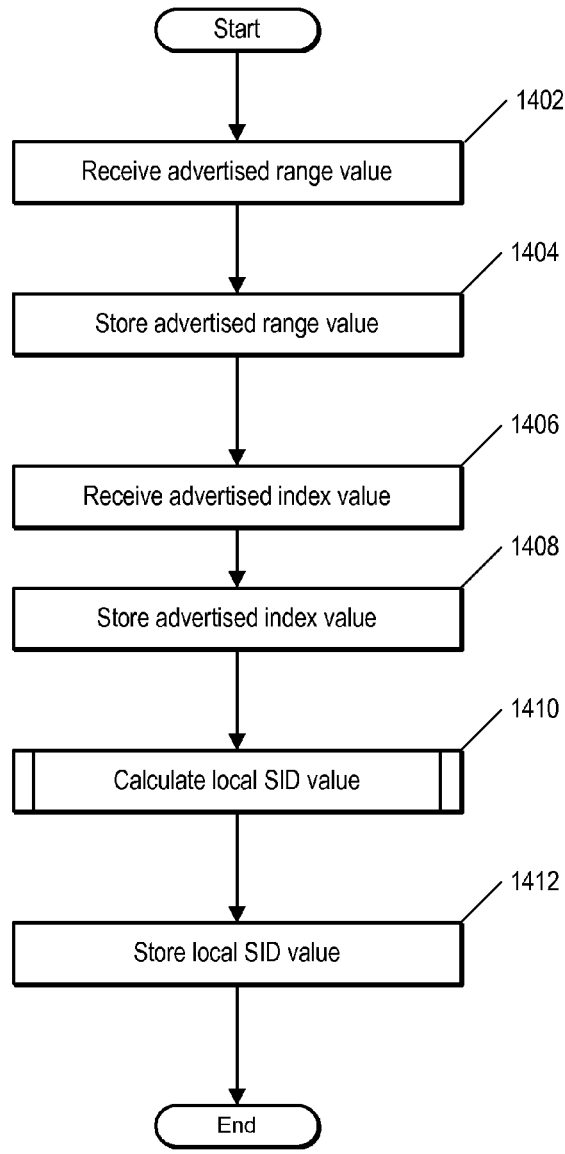
FIG. 14 is a flow chart illustrating an example process employed by a node of FIG. 7.

FIG. 14 is a flowchart illustrating operations performed by a node in an SR enabled network, such as network 700 of FIG. 7. The operations depicted in FIG. 14 can be performed by one or more components of a node, such as node 1600 of FIG. 16, and/or can be implemented in software as computer executable instructions that, when executed, perform the operations depicted in FIG. 14. The operations performed by the node in FIG. 14 can be performed in response to receiving advertisements including range and index values from other nodes included in the SR enabled network.

At 1402, a node receives an advertised range of SR values from another node in the SR enabled network. The received advertisement can include, for example, one or more lower, or base, SR values as well as one or more upper, or maximum SR values and/or one or more size values indicating the number of SR values and which SR values the sending node can use to identify nodal segments. At 1404, the node stores the advertised range value(s), for example, in a forwarding table. In one embodiment, the node associates the received range value(s) with a node prefix received from the same node.

The node receives an advertised index value at 1406. This index value is globally unique to the node that advertises the index value, so the node receives the index value from one and only one node. At 1408, the node stores the advertised index value, for example, in a forwarding table.

At 1410, the node calculates a local segment ID value that identifies a nodal segment corresponding to the node that advertised the range and index values. Additional details of this calculation are discussed with regard to FIG. 15. Once the local segment ID value has been calculated by the node, the node stores the local segment ID value, for example, in the forwarding table.

Figure 15:
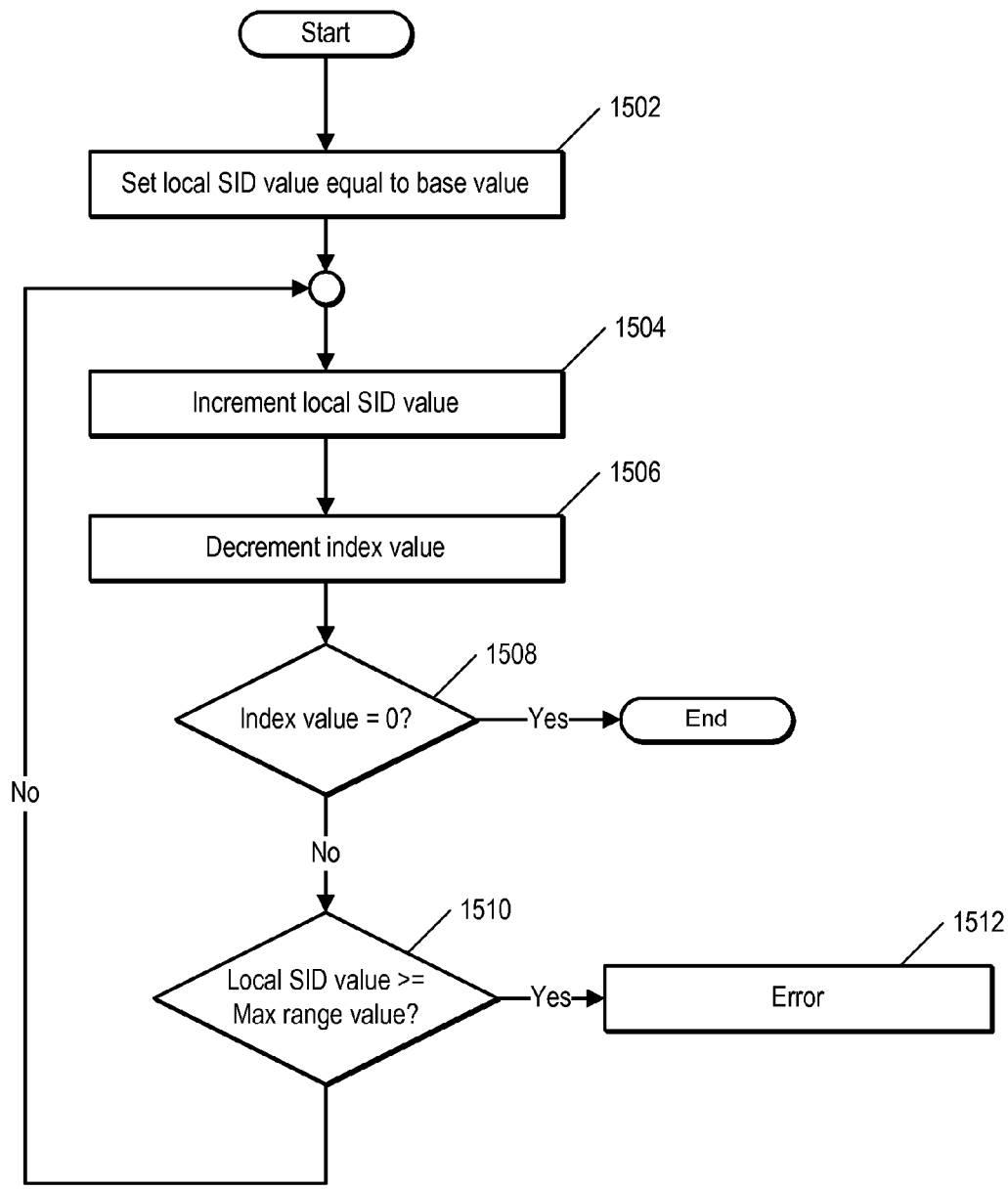
FIG. 15 is a flow chart illustrating an example process employed by a node of FIG. 7.

FIG. 15 is a flowchart illustrating additional details of calculating a local segment ID value, as shown in 1408 of FIG. 14. The operations depicted in FIG. 15 can be performed by one or more components of a node, such as node 1600 of FIG. 16, and/or can be implemented in software as computer executable instructions that, when executed, perform the operations depicted in FIG. 15.

At 1502, the node sets the value of a variable that corresponds to the local segment ID equal to the node's base SR value. At 1504, the node increments the variable. Next, at 1506, the node decrements an index value. This index value is the value received from the node that is associated with the nodal segment whose local segment ID is being calculated by the node. At 1508, the node determines whether the index value has reached zero. If so, the local segment ID has been calculated and the method ends. Otherwise, the node checks, at 1510, whether the local segment ID value is greater than or equal to a maximum range value. If so, an error has occurred and this is so indicated at 1512. Otherwise, the method returns to 1504, and the node increments variable corresponding to the local segment ID again.

Figure 16:
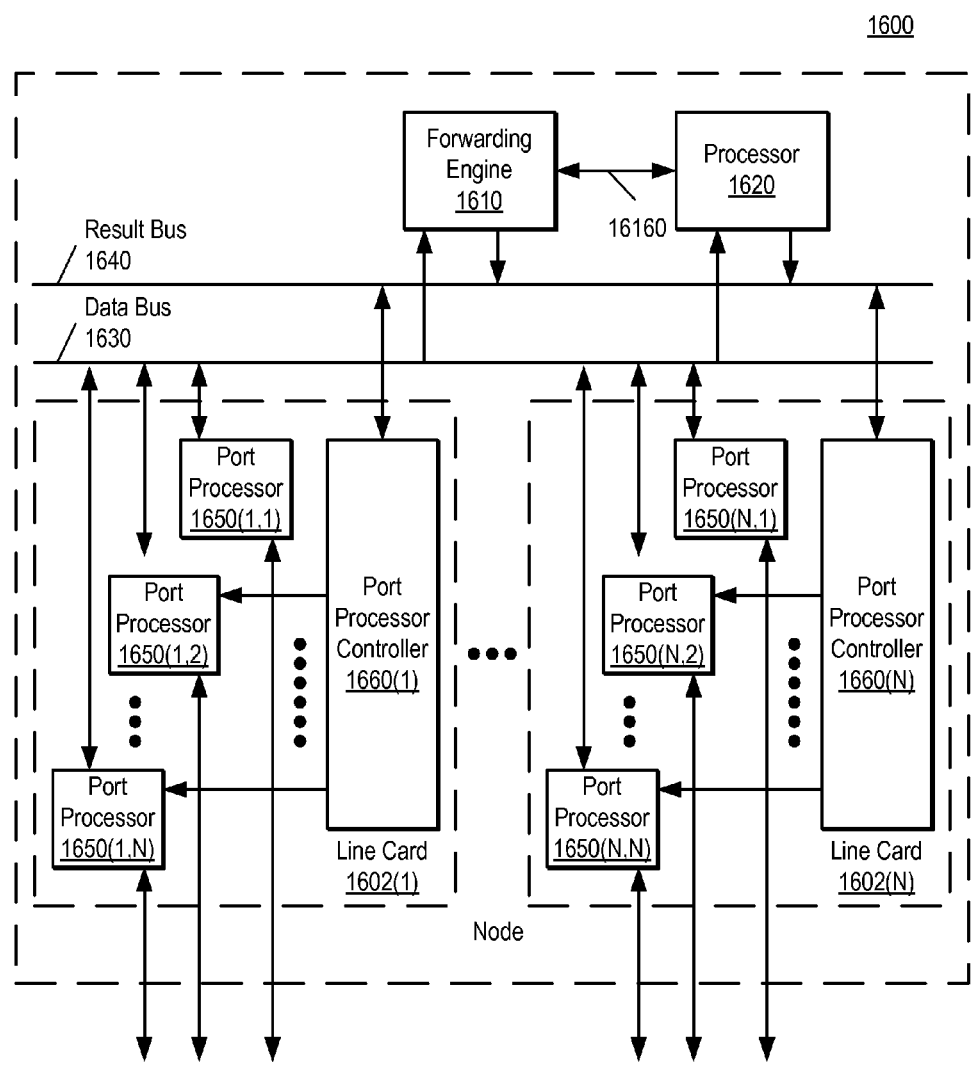
FIG. 16 is a block diagram illustrating certain components of an example node that can be employed in the network of FIG. 1 or 7.

FIG. 16 is a block diagram illustrating certain additional and/or alternative components of nodes that can be employed in the networks shown in FIGS. 1 and 7. In this depiction, node 1600 includes a number of line cards (line cards 1602(1)-(N)) that are communicatively coupled to a forwarding engine or packet forwarder 1610 and a processor 1620 via a data bus 1630 and a result bus 1640. Line cards 1602(1)-(N) include a number of port processors 1650(1, 1)-(N,N) which are controlled by port processor controllers 1660(1)-(N). It will also be noted that forwarding engine 1610 and processor 1620 are not only coupled to one another via data bus 1630 and result bus 1640, but are also communicatively coupled to one another by a communications link 16160.

The processors 1650 and 1660 of each line card 1602 may be mounted on a single printed circuit board. When a packet or packet and header are received, the packet or packet and header may be identified and analyzed by router 1600 in the following manner. Upon receipt, a packet (or some or all of its control information) or packet and header is sent from the one of port processors 1650(1,1)-(N,N) at which the packet or packet and header was received to one or more of those devices coupled to data bus 1630 (e.g., others of port processors 650(1,1)-(N,N), forwarding engine 1610 and/or processor 1620). Handling of the packet or packet and header can be determined, for example, by forwarding engine 1610. For example, forwarding engine 1610 may determine that the packet or packet and header should be forwarded to one or more of port processors 1650(1,1)-(N, N). This can be accomplished by indicating to corresponding one(s) of port processor controllers 1660(1)-(N) that the copy of the packet or packet and header held in the given one(s) of port processors 1650(1,1)-(N,N) should be forwarded to the appropriate one of port processors 1650(1,1)-(N,N). In addition, or alternatively, once a packet or packet and header has been identified for processing, forwarding engine 1610, processor 1620 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving an index value at a node, wherein
      the index value is globally unique within a network domain, and
   receiving a base value at the node, wherein
      the base value comprises one of a plurality of segment routing values, and
      the plurality of segment routing values comprises a set of segment routing values configured to identify nodal segments;
   calculating a segment identifier (segment ID) based on the index value and the base value;
   calculating, based on the index value and a second base value, a next hop segment ID associated with a packet, wherein the second base value comprises one of a second plurality of segment routing values reserved by a next-hop node; and
   forwarding the packet based on the next hop segment ID.

2. The method of claim 1, wherein
   the segment ID comprises a locally-significant segment ID of the nodal segment, and
   the nodal segment is rooted at the node.

3. The method of claim 1, further comprising:
   receiving the packet comprising the segment ID; and
   determining the next-hop node for the packet.

4. The method of claim 1, wherein
   calculating the next-hop segment ID comprises calculating the index value based on the segment ID and a base value associated with a downstream node.

5. The method of claim 3, further comprising:
   removing the segment ID from the packet; and
   inserting the next hop segment ID into the packet.

6. The method of claim 1, further comprising:
   advertising the index value; and
   advertising a range of segment routing values, wherein
      the plurality of segment routing values comprises the range of segment routing values.

7. The method of claim 1, further comprising:
   assigning the index value, wherein
      assigning the index value comprises verifying that a total number of assigned index values does not exceed a limit, and
      the limit corresponds to a size of a smallest range of segment IDs advertised by any node in the network domain.

8. The method of claim 7, further comprising:
receiving, by an administrative entity, a configuration request from the node;
determining an available range of segment routing values on the node; and
allocating the plurality of segment routing values based on the available range of segment routing values.

9. The method of claim 1, wherein
the plurality of segment routing values comprises a plurality of disjoint subsets of segment routing values.

10. The method of claim 1, further comprising:
storing the index value in a data structure;
storing the base value in the data structure; and
storing the segment ID in the data structure.

11. A system comprising:
a first node comprising a memory and one or more processors, the first node configured to
receive an index value, wherein
the index value is globally unique within a network domain,
receive a base value, wherein
the base value comprises one of a plurality of segment routing values, and
the plurality of segment routing values comprises a set of segment routing values configured to identify nodal segments,
calculate a segment identifier (segment ID) based on the index value and the base value,
calculate, based on the index value and a second base value, a next hop segment ID associated with a packet, wherein the second base value comprises one of a second plurality of segment routing values reserved by a next-hop node, and
forwarding the packet based on the next hop segment ID.

12. The system of claim 11, wherein
the segment ID comprises a locally-significant segment ID of the nodal segment, and
the nodal segment is rooted at the first node.

13. The system of claim 11, wherein the first node is further configured to:
receive the packet comprising the segment ID; and
determine the next-hop node for the packet.

14. The system of claim 11, wherein
calculating the next hop segment ID comprises calculating the index value based on the segment ID and a base value associated with a downstream node.

15. The system of claim 13, wherein the first node is further configured to:
remove the segment ID from the packet; and
insert the next hop segment ID into the packet.

16. The system of claim 11, wherein the first node is further configured to:
advertise the index value; and
advertise a range of segment routing values, wherein
the plurality of segment routing values comprises the range of segment routing values.

17. The system of claim 11, further comprising:
an administrative entity configured to
receive a configuration request from the first node,
determine an available range of segment routing values on the first node, and
allocate the plurality of segment routing values based on the available range of segment routing values.

18. The system of claim 11, wherein
the plurality of segment routing values comprises a plurality of disjoint subsets of segment routing values.

19. The system of claim 11, wherein the first node is further configured to:
store the index value in a data structure;
store the base value in the data structure; and
store the segment ID in the data structure.

20. An apparatus comprising:
a first node comprising:
a first means for receiving an index value, wherein the index value is globally unique within a network domain,
a second means for receiving a base value, wherein
the base value comprises one of a plurality of segment routing values, and
the plurality of segment routing values comprises a set of segment routing values configured to identify nodal segments,
a third means for calculating a segment identifier (segment ID) based on the index value and the base value, and
a fourth means for
determining a next hop node for a packet,
calculating a next hop segment ID associated with the packet based on the index value and a second base value, and
forwarding the packet based on the next hop segment ID.

* * * * *